United States Patent
Lee et al.

(10) Patent No.: US 10,846,499 B2
(45) Date of Patent: Nov. 24, 2020

(54) FINGERPRINT SENSOR, DISPLAY DEVICE INCLUDING THE SAME, AND METHOD OF OPERATING FINGERPRINT SENSOR

(71) Applicant: SAMSUNG DISPLAY CO., LTD., Yongin-si, Gyeonggi-do (KR)

(72) Inventors: Sun Hwa Lee, Yongin-si (KR); Mu Kyung Jeon, Yongin-si (KR); Mee Hye Jung, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 9 days.

(21) Appl. No.: 16/000,259

(22) Filed: Jun. 5, 2018

(65) Prior Publication Data
US 2019/0034688 A1    Jan. 31, 2019

(30) Foreign Application Priority Data
Jul. 27, 2017 (KR) .................. 10-2017-0095686

(51) Int. Cl.
| | |
|---|---|
| *G06K 9/00* | (2006.01) |
| *G01D 5/24* | (2006.01) |
| *G06F 3/041* | (2006.01) |
| *G06F 21/32* | (2013.01) |
| *H01L 51/52* | (2006.01) |
| *H01L 27/32* | (2006.01) |
| *G06K 9/22* | (2006.01) |
| *G06F 3/044* | (2006.01) |

(52) U.S. Cl.
CPC ....... *G06K 9/00013* (2013.01); *G01D 5/2405* (2013.01); *G06F 3/041* (2013.01); *G06F 3/044* (2013.01); *G06F 3/0412* (2013.01); *G06F 3/0418* (2013.01); *G06F 21/32* (2013.01); *G06K 9/0002* (2013.01); *G06K 9/22* (2013.01); *H01L 27/3234* (2013.01); *H01L 51/5253* (2013.01); *H01L 51/5281* (2013.01); *H01L 27/323* (2013.01)

(58) Field of Classification Search
None
See application file for complete search history.

(56) References Cited

U.S. PATENT DOCUMENTS

| | | | |
|---|---|---|---|
| 7,116,116 B2 | 10/2006 | Ebihara et al. | |
| 9,689,825 B1* | 6/2017 | Lim | G01N 27/24 |
| 10,055,630 B2* | 8/2018 | Lee | G06K 9/0002 |
| 2005/0179446 A1* | 8/2005 | Hara | G01D 5/2405 |
| | | | 324/662 |
| 2009/0208069 A1* | 8/2009 | Chuang | G06K 9/0002 |
| | | | 382/124 |

(Continued)

FOREIGN PATENT DOCUMENTS

| | | |
|---|---|---|
| KR | 101210473 B1 | 12/2012 |
| KR | 1020180051692 A | 5/2018 |

*Primary Examiner* — David D Davis
(74) *Attorney, Agent, or Firm* — Cantor Colburn LLP

(57) ABSTRACT

A fingerprint sensor includes: sensor pixels, each including a first transistor which controls a sensing signal to be outputted to a corresponding one of output lines; power lines disposed on a vertical line basis and each electrically connected to sensor pixels disposed on a corresponding vertical line; and a power supply unit which supplies reference voltages to the power lines. The power supply unit supplies the reference voltages, which is adjusted on the vertical line basis, to the power lines.

17 Claims, 12 Drawing Sheets

(56) References Cited

U.S. PATENT DOCUMENTS

| | | | |
|---|---|---|---|
| 2012/0182253 A1* | 7/2012 | Brosnan | G06F 3/0416 345/174 |
| 2013/0287274 A1* | 10/2013 | Shi | G06F 3/044 382/124 |
| 2014/0176401 A1* | 6/2014 | Kim | G09G 3/3208 345/76 |
| 2016/0299598 A1* | 10/2016 | Yoon | G06F 3/044 |
| 2017/0017828 A1* | 1/2017 | Bernstein | G06K 9/00053 |
| 2017/0103706 A1* | 4/2017 | Yang | G06F 3/0416 |
| 2017/0351364 A1* | 12/2017 | Kim | G06F 3/0416 |
| 2017/0371462 A1* | 12/2017 | Kim | G06F 3/0412 |
| 2018/0005013 A1* | 1/2018 | Liao | G06K 9/0002 |
| 2018/0060642 A1* | 3/2018 | Kim | G02B 5/045 |
| 2018/0130857 A1 | 5/2018 | Lee et al. | |
| 2018/0239940 A1* | 8/2018 | Kim | G06K 9/0002 |
| 2018/0276442 A1* | 9/2018 | Kim | G06K 9/0002 |

\* cited by examiner

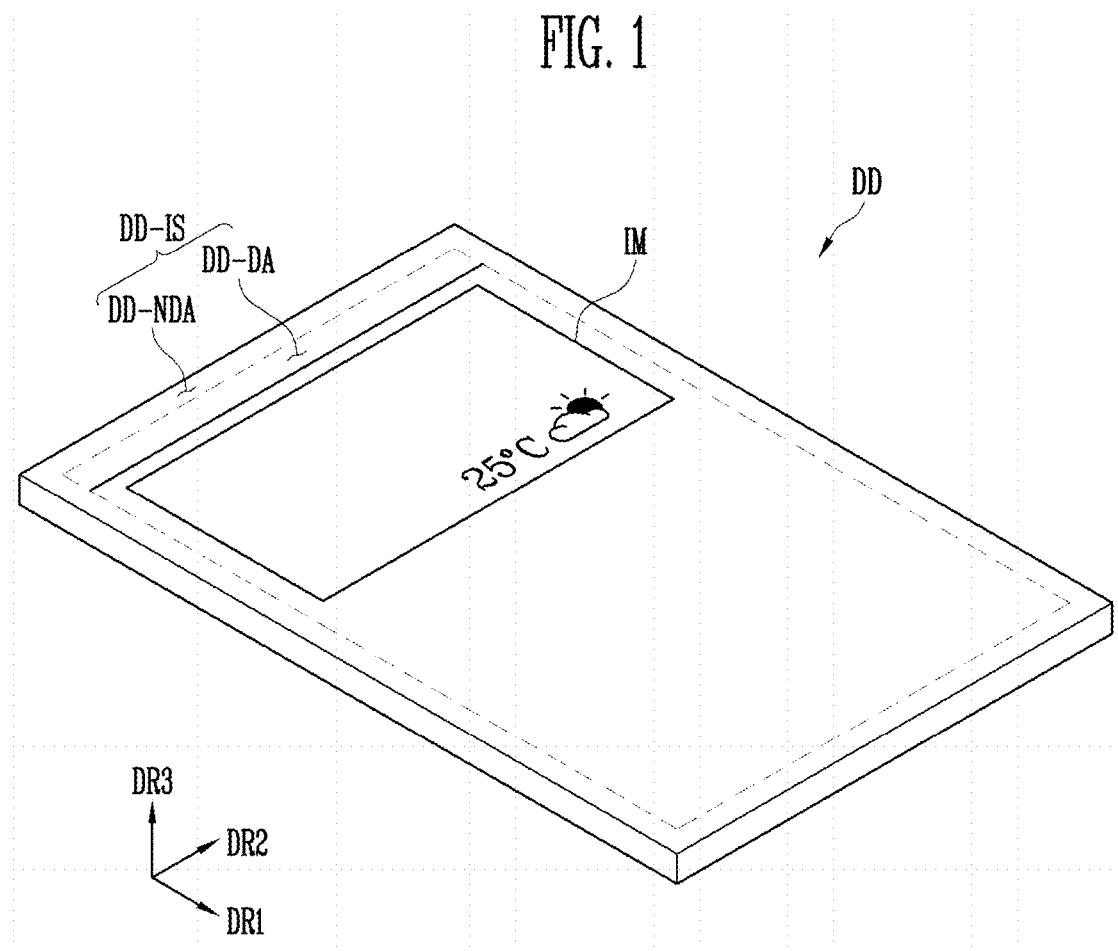

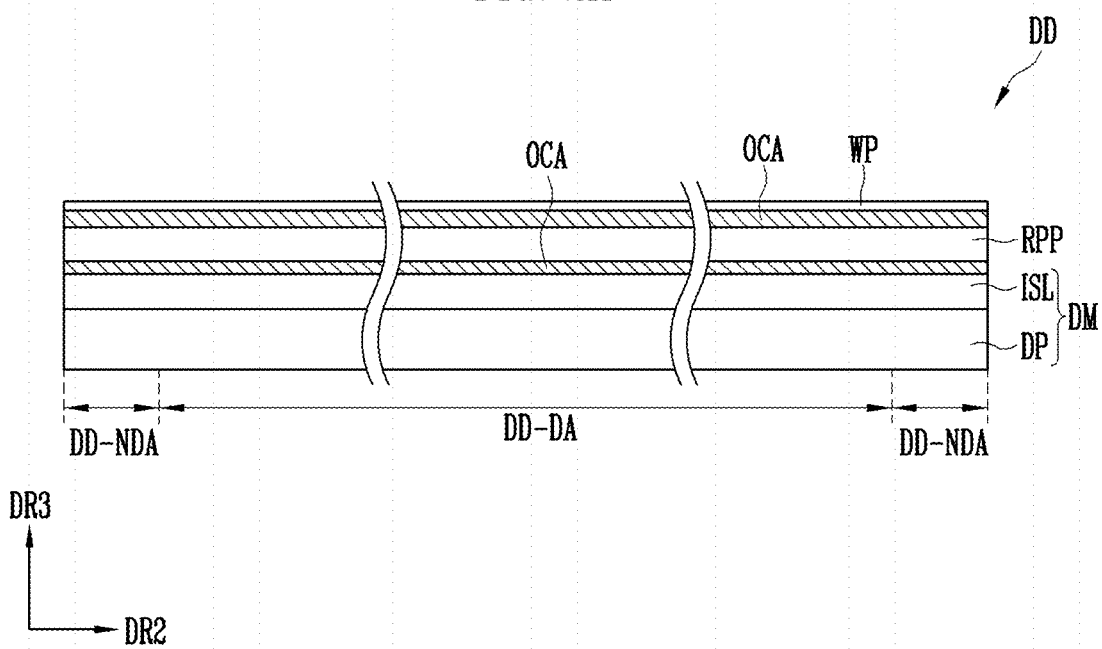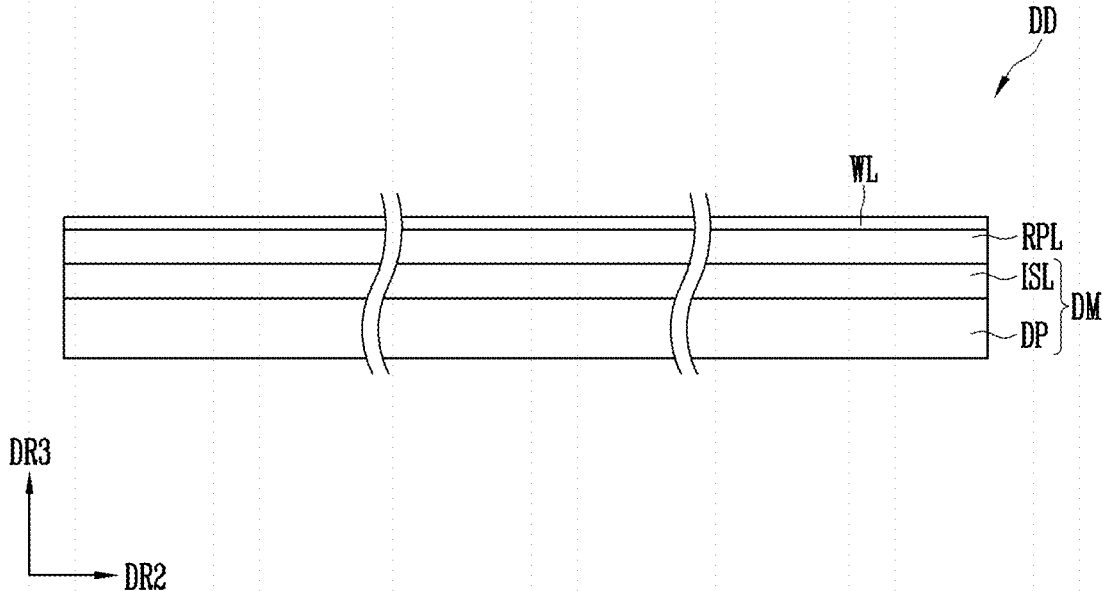

FIG. 2C
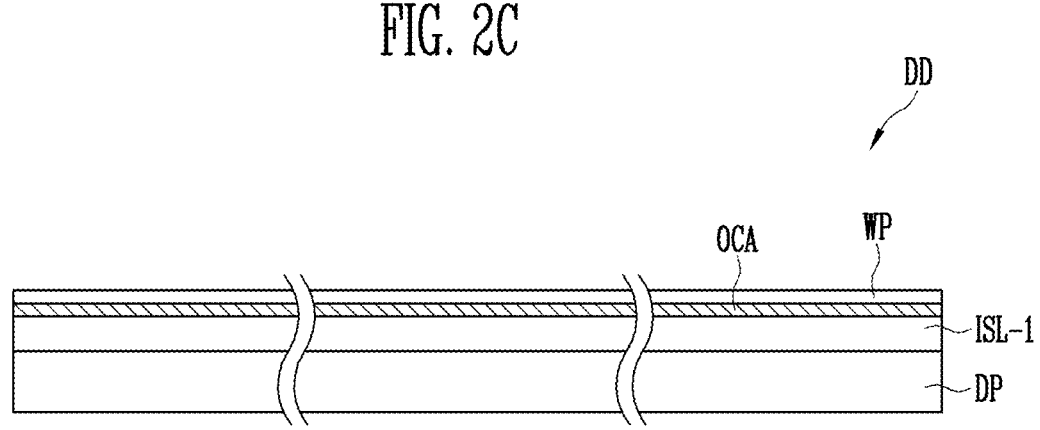
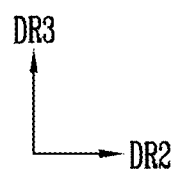
FIG. 2D
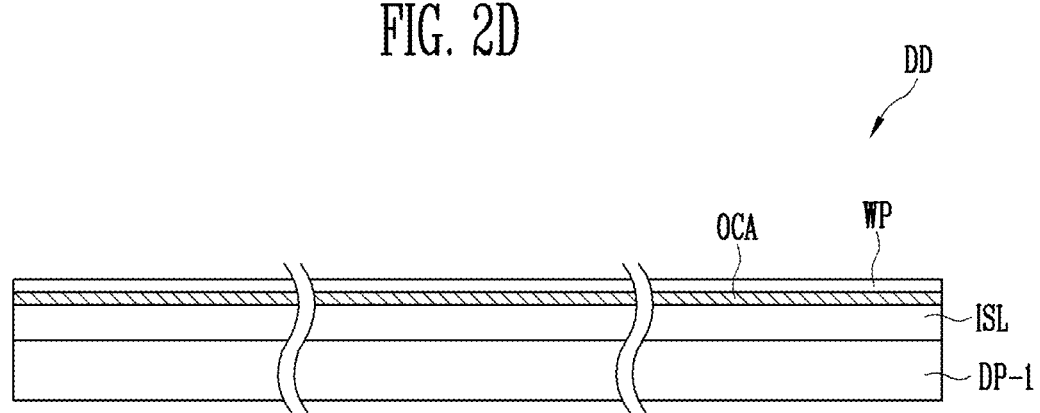
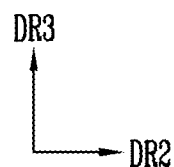

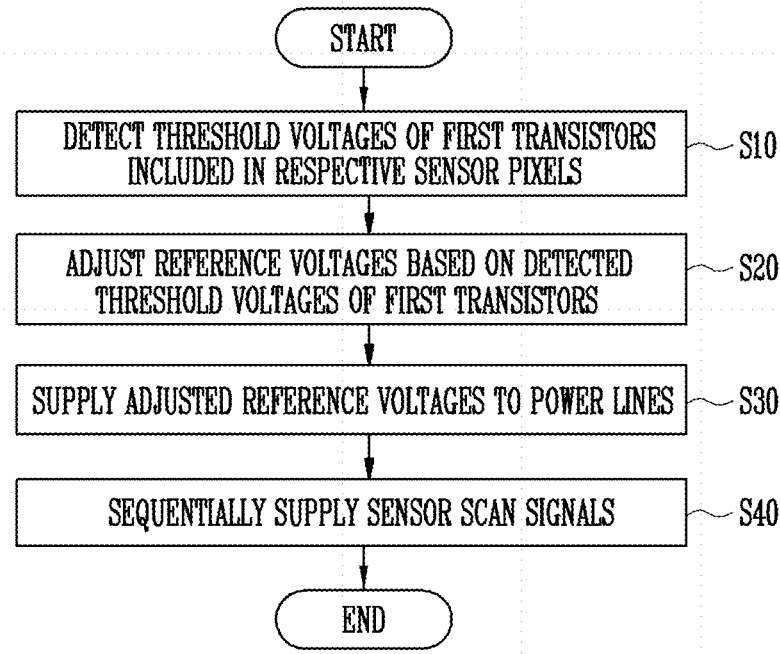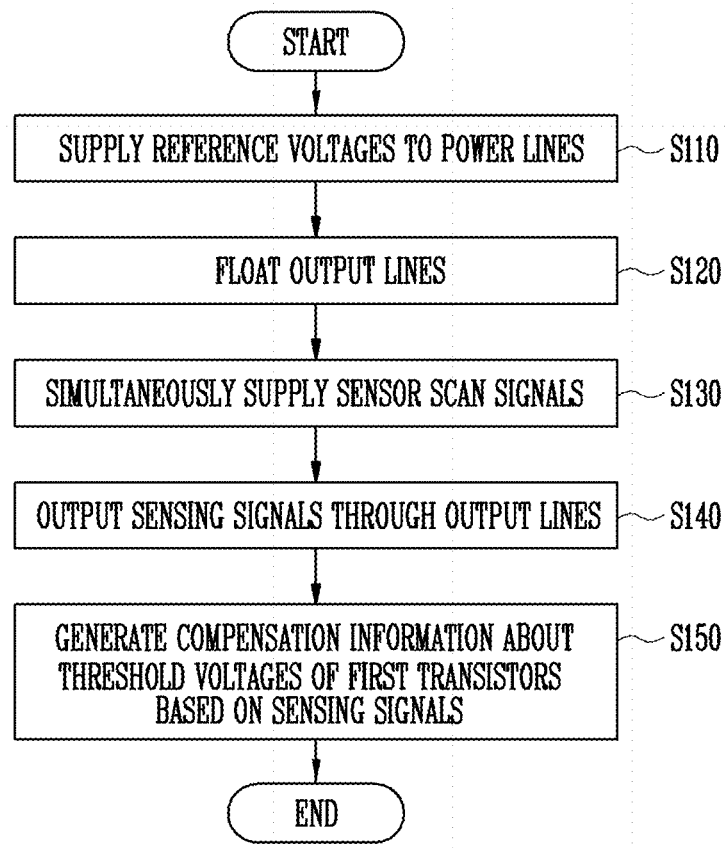

FINGERPRINT SENSOR, DISPLAY DEVICE INCLUDING THE SAME, AND METHOD OF OPERATING FINGERPRINT SENSOR

This application claims priority to Korean Patent Application No. 10-2017-0095686 filed on Jul. 27, 2017, and all the benefits accruing therefrom under 35 U.S.C. 119, the content of which in its entirety is herein incorporated by reference.

BACKGROUND

1. Field

Embodiments of the disclosure relate to a fingerprint sensor, a display device including the fingerprint sensor, and a method of operating the fingerprint sensor.

2. Description of Related Art

With growing demand for a portable information display to use information media, research on display devices and commercialization thereof have rapidly progressed.

Recently, various additional functions, which utilize personal information for financial or security functions, as well as communication functions such as call services or text message sending services, have been provided via display devices, and thus fingerprint sensors for identification to restrict unauthorized access have been widely used in display devices.

SUMMARY

Embodiments of the disclosure are directed to a fingerprint sensor, a display device including the fingerprint sensor, and a method of operating the fingerprint sensor, which may enhance a fingerprint sensing sensitivity by compensating for a difference in threshold voltage between sensor pixels.

According to an embodiment of the invention, a fingerprint sensor includes: sensor pixels, each including a first transistor which controls a sensing signal to be outputted to a corresponding one of output lines; power lines disposed on a vertical line basis and each connected to sensor pixels disposed on a corresponding vertical line; and a power supply unit which supplies reference voltages to the power lines. In such an embodiment, reference voltages are adjusted on the vertical line basis, and the power supply unit supplies the adjusted reference voltages to the power lines.

In an embodiment, the fingerprint sensor may further include: a read-out circuit which receives sensing signals outputted from the sensor pixels through the output lines connected to the sensor pixels, detect threshold voltages of the first transistors based on the sensing signals, and generate compensation information; and a controller which adjusts the reference voltages on the vertical line basis based on the compensation information.

In an embodiment, the compensation information may include an average value of the threshold voltages of the first transistors of the sensor pixels connected to each of the power lines.

In an embodiment, the controller may adjust each of the reference voltages by adding or subtracting the corresponding average value to or from the reference voltage.

In an embodiment, the fingerprint sensor may further include a sensor scan driver which supplies sensor scan signals to sensor scan lines connected to the sensor pixels.

In an embodiment, the sensor scan driver may simultaneously supply the sensor scan signals to the sensor scan lines during a first sub-period. In such an embodiment, the sensor scan driver may sequentially supply the sensor scan signals to the sensor scan lines during a second sub-period subsequent to the first sub-period. In such an embodiment, a frame period may include the first sub-period and the second sub-period.

In an embodiment, a sensor pixel, which is connected to an i-th (i is a natural number) sensor scan line of the sensor scan lines and a j-th (j is a natural number) output line of the output lines, may include a sensor circuit, and a first capacitor including a sensor electrode and an auxiliary electrode. In such an embodiment, the sensor circuit may include: the first transistor including a gate electrode connected to the sensor electrode; a second transistor connected between a j-th power line of the power lines and the first transistor; and a third transistor connected between the j-th power line and the sensor electrode. In such an embodiment, the auxiliary electrode of the first capacitor may be connected to the i-th sensor scan line.

In an embodiment, a gate electrode of the second transistor may be connected to the i-th sensor scan line, and a gate electrode of the third transistor may be connected to an (i−1)-th sensor scan line of the sensor scan lines.

In an embodiment, when a touch of a hand of a user occurs on the fingerprint sensor, the sensor electrode may form a second capacitor with the hand of the user, and recognize a fingerprint or a palm print of the user based on a change in capacitance of the second capacitor corresponding to the touch.

According to another embodiment of the invention, a display device includes: a display panel which displays an image; and a fingerprint sensor disposed on the display panel and which senses a fingerprint. In such an embodiment, the fingerprint sensor includes: sensor pixels, each including a first transistor which controls a sensing signal to be outputted to a corresponding one of output lines; power lines disposed on a vertical line basis and each connected to sensor pixels disposed on a corresponding vertical line; and a power supply unit connected to the power lines. In such an embodiment, reference voltages are adjusted on the vertical line basis, and the power supply unit may supply the adjusted reference voltages to the power lines.

In an embodiment, the fingerprint sensor may include: a read-out circuit which receives sensing signals outputted from the sensor pixels through the output lines connected to the sensor pixels, detects threshold voltages of the first transistors based on the sensing signals, and generates compensation information; and a controller which adjusts the reference voltages on the vertical line basis based on the compensation information.

In an embodiment, the fingerprint sensor may further include a sensor scan driver which supplies sensor scan signals to sensor scan lines connected to the sensor pixels.

In an embodiment, the sensor scan driver may simultaneously supply the sensor scan signals to the sensor scan lines during a first sub-period. In such an embodiment, the sensor scan driver may sequentially supply the sensor scan signals to the sensor scan lines during a second sub-period subsequent to the first sub-period. In such an embodiment, a frame period may include the first sub-period and the second sub-period.

In an embodiment, a sensor pixel, which is connected to an i-th (i is a natural number) sensor scan line of the sensor scan lines and a j-th (j is a natural number) output line of the output lines, may include a sensor circuit, and a first capacitor including a sensor electrode and an auxiliary electrode. In such an embodiment, the sensor circuit may include: the first transistor including a gate electrode connected to the sensor electrode; a second transistor connected between a j-th power line of the power lines and the first transistor; and a third transistor connected between the j-th power line and the sensor electrode. In such an embodiment, the auxiliary electrode of the first capacitor may be connected to the i-th sensor scan line.

In an embodiment, a second gate electrode of the second transistor may be connected to the i-th sensor scan line, and a gate electrode of the third transistor may be connected to an (i−1)-th sensor scan line of the sensor scan lines.

In an embodiment, when a touch of a hand of a user occurs on the fingerprint sensor, the sensor electrode may form a second capacitor with the hand of the user and recognize a fingerprint or a palm print of the user based on a change in capacitance of the second capacitor corresponding to the touch.

In an embodiment, the fingerprint sensor may be disposed directly on the display panel.

In an embodiment, the fingerprint sensor may be disposed directly on a thin-film encapsulation layer of the display panel.

According to another embodiment of the invention, a method of operating a fingerprint sensor includes: detecting threshold voltages of first transistors included in respective sensor pixels of the fingerprint sensor; adjusting reference voltages based on the detected threshold voltages; supplying the adjusted reference voltages to power lines of the finger print sensor, which are connected to the sensor pixels; and sequentially supplying sensor scan signals to sensor scan lines of the finger print sensor, which are connected to the sensor pixels. In such an embodiment, the first transistors controls sensing signals to be outputted to output lines connected to the sensor pixels.

In an embodiment, the detecting of the threshold voltages of the first transistors may include: supplying the reference voltages to the power lines; simultaneously supplying the sensor scan signals to the sensor scan lines; outputting the sensing signals through the output lines; and detecting the thresholds voltages of the first transistors based on the sensing signals, and generating compensation information. The compensation information may include an average value of the threshold voltages of the first transistors of the sensor pixels connected to each of the power lines.

BRIEF DESCRIPTION OF THE DRAWINGS

The above and other features of the invention will become more apparent by describing in further detail exemplary embodiments thereof with reference to the accompanying drawings, in which:

FIG. 1 is a perspective view illustrating a display device in accordance with an embodiment of the disclosure;

FIGS. 2A to 2D are sectional views of embodiments of the display device;

FIG. 11 is a flowchart illustrating a method of operating a fingerprint sensor in accordance with an embodiment of the disclosure; and FIG. 12 is a flowchart illustrating in detail the step of detecting a threshold voltage shown in FIG. 11.

DETAILED DESCRIPTION

Figure 3:
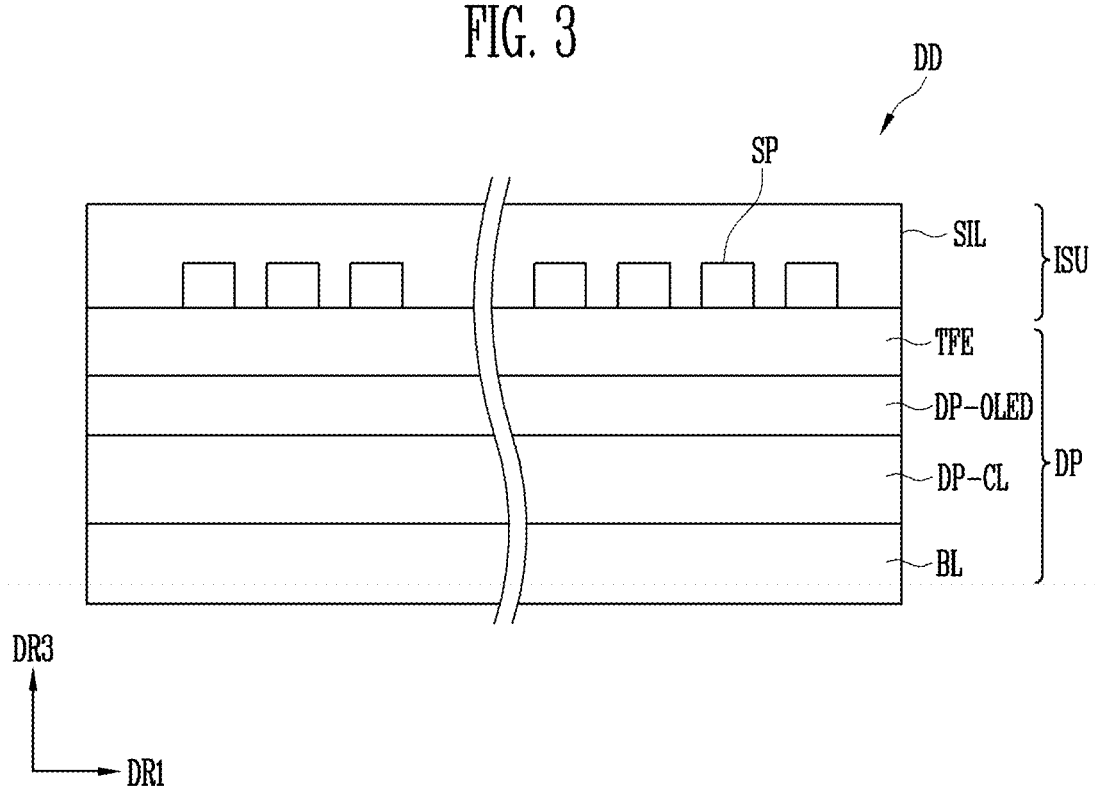
FIG. 3 is a diagram illustrating a detailed cross-sectional structure of a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. It is also noted that herein, "connected/coupled" refers to one component not only directly coupling another component but also indirectly coupling another component through an intermediate component. On the other hand, "directly connected/directly coupled" refers to one component directly coupling another component without an intervening component therebetween.

It will be understood that, although the terms "first", "second", etc. may be used herein to describe various elements, components, regions, layers and/or sections, these elements should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a perspective view illustrating a display device DD in accordance with an embodiment of the disclosure. In an embodiment, as shown in FIG. 1, the display device DD may display an image IM through a display surface DD-IS. The display surface DD-IS is parallel to a plane defined by a first directional axis DR1 and a second directional axis DR2. A normal direction of the display surface DD-IS, i.e., a thickness direction of the display device DD, is defined as a third directional axis DR3.

A front surface (or an upper surface) and a rear surface (or a lower surface) of each of elements or units of the display device DD, which will be described herein below, are defined based on the third directional axis DR3. However, the first to third directional axes DR1, DR2, and DR3 herein are merely defined for convenience of description and illustration, and directions indicated by the first to third directional axes DR1, DR2, and DR3 are relative concepts and may be changed to other directions. Hereinafter, first to third directions are directions indicated by the first to third directional axes DR1, DR2, and DR3, and will be respectively designated by the same reference characters as those of the first to third directional axes DR1, DR2, and DR3.

In an embodiment of the disclosure, the display device DD includes a planar display surface, but the disclosure is not limited thereto. In an alternative embodiment, the display device DD may include a curved display surface or a three-dimensional display surface. The three-dimensional display surface may include a plurality of display areas oriented in different directions, respectively. In one embodiment, for example, the three-dimensional display surface may include a polyprism-shaped display surface.

In an embodiment, the display device DD may be a rigid display device, but the disclosure is not limited thereto. In an alternative embodiment, the display device DD may be a flexible display device DD. In FIG. 1, an embodiment, where a display device DD is applied to a mobile terminal or a cellular phone, is illustrated. Although not shown, in such an embodiment, the mobile terminal or the cellular phone may further include electronic modules, a camera module, a power supply module, and so forth, which are mounted on a main board. In such an embodiment, such modules may be disposed, along with the display device DD, on/in a bracket/casing or the like. In an embodiment, the display device DD may be applied not only to large electronic devices such as a television and monitor, but also to small and medium devices such as a tablet personal computer ("PC"), a vehicle navigation system, a game console, and a smartwatch.

In an embodiment, as shown in FIG. 1, the display surface DD-IS includes a display area DD-DA on which an image IM is displayed, and a non-display area DD-NDA around the display area DD-DA. The non-display area DD-NDA is an area on which an image is not display. In an embodiment, as shown in FIG. 1, the image IM may be icon images, for example.

In an embodiment, as shown in FIG. 1, the display area DD-DA is rectangular. The non-display area DD-NDA encloses the display area DD-DA. However, the disclosure is not limited thereto, and the shape of the display area DD-DA and the shape of the non-display area DD-NDA may be variously modified.

FIGS. 2A to 2D are sectional views of embodiments of the display device DD. FIGS. 2A to 2D show cross-sections cut through a plane parallel to the second directional axis DR2 and the third directional axis DR3. FIGS. 2A to 2D are schematic views showing a stacking relationship of functional panels and/or functional units that constitute embodiments of the display device DD.

In an embodiment, the display device DD may include a display panel, a fingerprint sensor, a reflection prevention unit, and a window unit. At least some components of the display panel, the fingerprint sensor, the reflection prevention unit, and the window unit may be provided or formed through successive processes, or at least some components may be coupled to each other by an adhesive member. In an embodiment, as shown in FIGS. 2A to 2D, the adhesive member may be an optically clear adhesive member OCA, for example. The adhesive member, which will be described hereinafter, may include a typical adhesive or temporary adhesive. In an embodiment of the disclosure, the reflection prevention unit and the window unit may be replaced with other components or omitted.

In an embodiment, as shown in FIGS. 2A to 2D, among the fingerprint sensor, the reflection prevention unit, and the window unit, a component formed with another component through a successive process is defined as "layer". Of the reflection prevention unit and the window unit, a component coupled to another component by an adhesive member will be defined as "panel". Although the panel may include a base layer, e.g., a synthetic resin film, a composite material film, or a glass substrate, for providing a base surface, "layer" may be provided without the base layer. In such an embodiment, the units described as "layer" may be disposed on base surfaces provided by other units.

The fingerprint sensor, the reflection prevention unit, and the window unit may be referred to as an input sensing panel ISP, a reflection prevention panel RPP and a window panel WP, respectively, or as a fingerprint sensor layer ISL, a reflection prevention layer and a window layer WL, respectively, depending on whether a base layer is present or not.

In an embodiment, as shown in FIG. 2A, the display device DD may include a display panel DP, a fingerprint sensor layer ISL, a reflection prevention panel RPP, and a window panel WP. The fingerprint sensor layer ISL may be directly disposed on the display panel DP. Herein, the phrase "component B is directly disposed on component A" mean that there is no separate adhesive layer/member between component A and component B. Component B may be formed on a base surface provided by component A through a successive process after component A has been formed. The display panel DP and the fingerprint sensor layer ISL that is directly disposed on the display panel DP may be defined as a display module DM. In such an embodiment, as shown in FIG. 2A, optically clear adhesive members OCA may be respectively disposed between the display module DM and the reflection prevention panel RPP and between the reflection prevention panel RPP and the window panel WP.

The display panel DP may display an image. The fingerprint sensor layer ISL may obtain coordinate information of an external input (e.g., a touch thereon). In such an embodiment, although not shown, the display module DM may further include a protective member disposed on a lower surface of the display panel DP. The protective member and the display panel DP may be coupled to each other by an adhesive member. Embodiments of the display devices DD of FIGS. 2B to 2D, which will be described later, may also further include a protective member.

In an embodiment, the display panel DP may be a light-emitting display panel, but is not limited to a particular type of display panel. In one embodiment, for example, the display panel DP may be an organic light-emitting display panel or a quantum dot light-emitting display panel. An emission layer of the organic light-emitting display panel may include organic light-emitting material. An emission layer of the quantum dot light-emitting display panel may include quantum dots and quantum rods. Hereinafter, for convenience of description, embodiments, where the display panel DP is an organic light-emitting display panel, will be described in detail.

The reflection prevention panel RPP reduces the reflectivity of external light that is incident from an upper surface of the window panel WP. The reflection prevention panel RPP may include a phase retarder and a polarizer. The phase retarder may be a film type retarder or a liquid crystal coated retarder, and include a λ/2 phase retarder and/or a λ/4 phase retarder. The polarizer may also be a film type polarizer or a liquid crystal coated polarizer. The film type retarder or polarizer may include an elongation synthetic resin film, and the liquid crystal coated retarder or polarizer may include liquid crystals arranged in a predetermined arrangement. Each of the phase retarder and the polarizer may further include a protective film. The phase retarder and the polarizer, or the protective film may function as the base layer of the reflection prevention panel RPP.

The reflection prevention panel RPP may include color filters. The color filters have a predetermined arrangement. The arrangement of the color filters may be determined based on emission colors of pixels included in the display panel DP. The reflection prevention panel RPP may further include a black matrix adjacent to the color filters.

In an embodiment, the reflection prevention panel RPP may include a destructive interference structure. In one embodiment, for example, the destructive interference structure may include a first reflective layer and a second reflective layer which are disposed on different layers, respectively. First reflective light and second reflective light, which are respectively reflected by the first reflective layer and the second reflective layer, may destructively interfere with each other, whereby the reflectivity of external light may be reduced.

In an embodiment, the window panel WP includes a base film (not shown) and a light shielding pattern (not shown). The base film may include a glass substrate and/or a synthetic resin film. The base film is not limited to a single-layer structure. The base film may include two or more films coupled to each other by an adhesive member.

In such an embodiment, the light-shielding pattern may partially overlap the base film. The light-shielding pattern may be disposed on a rear surface of the base film and define a bezel area, e.g., a non-display area DD-NDA (refer to FIG. 1), of the display device DD.

The light-shielding pattern may be a colored organic layer and be formed by, e.g., a coating method. In an embodiment, although not shown, the window panel WP may further include a functional coating layer disposed on a front surface of the base film. The functional coating layer may include a fingerprint prevention layer, a reflection prevention layer or a hard coating layer, for example.

In an alternative embodiment, as shown in FIG. 2B, the display device DD may include a display panel DP, a fingerprint sensor layer ISL, a reflection prevention layer RPL, and a window layer WL. Adhesive members may be omitted from the display device DD, and the fingerprint sensor layer ISL, the reflection prevention layer RPL, and the window layer WL may be provided or formed on a base surface provided on the display panel DP through successive processes. A stacking sequence of the fingerprint sensor layer ISL and the reflection prevention layer RPL may be variously modified.

In other alternative embodiment, as shown in FIGS. 2C and 2D, the display device DD may not include a separate reflection prevention unit.

In an embodiment, as shown in FIG. 2C, the display device DD may include a display panel DP, a fingerprint sensor layer ISL-1, and a window panel WP. In such an embodiment, the fingerprint sensor layer ISL-1 may have a reflection prevention function.

In an alternative embodiment, as shown in FIG. 2D, the display device DD may include a display panel DP-1, a fingerprint sensor layer ISL, and a window panel WP. In such an embodiment, the display panel DP-1 may have a reflection prevention function.

In embodiments of the invention, as shown in FIGS. 2A to 2D, a fingerprint sensor is disposed to overlap an entire surface of the display panel. In an embodiment, as shown in FIG. 2A, the fingerprint sensor may overlap or cover an entire portion of the display area DD-DA.

In an embodiment of the disclosure, the fingerprint sensor may overlap only a portion of the display area DD-DA, or overlap only the non-display area DD-NDA. The fingerprint sensor may be a touch sensing panel for sensing a touch of a user, or a fingerprint sensing panel for sensing fingerprint information of the finger of the user.

The pitches and widths of sensing electrodes may be determined based on the use purpose of the fingerprint sensor. Sensing electrodes of the touch sensing panel may have a width ranging from several millimeters (mm) to several tens of millimeters (mm). Sensing electrodes of the fingerprint sensing panel may have a width ranging from several tens of micrometers (μm) to several hundreds of micrometers (μm).

FIG. 3 is a sectional view of the display device DD in accordance with an embodiment of the disclosure. Referring to FIG. 3, an embodiment of the display device DD may include a display panel DP and a fingerprint sensor ISU.

In FIG. 3, the display panel DP is schematically shown to show a stacking structure of the fingerprint sensor ISU with further clarification. For convenience of illustration, a reflection prevention unit and a window unit, which may be disposed on the fingerprint sensor ISU, are omitted in FIG. 3.

In an embodiment, as shown in FIG. 3, the display panel DP may include a base layer BL, a circuit element layer DP-CL disposed on the base layer BL, a display element layer DP-OLED, and a thin-film encapsulation layer TFE. In such an embodiment, although not shown, the display panel DP may further include functional layers such as a reflection prevention layer and a refractivity adjustment layer.

The base layer BL may include a synthetic resin layer. Thereafter, a conductive layer, an insulating layer, and so forth may be provided or formed on the synthetic resin layer. The synthetic resin layer may be a polyimide resin layer, but the material thereof is not limited to a particular material. Alternatively, the base layer BL may include a glass substrate, a metal substrate, an organic/inorganic composite material substrate, or the like.

The circuit element layer DP-CL may include an insulating layer and a circuit element. Hereinafter, the insulating layer included in the circuit element layer DP-CL will be referred to as an intermediate insulating layer. The intermediate insulating layer may include an intermediate inorganic layer and an intermediate organic layer. The circuit element includes a signal line, a pixel driving circuit, etc. The circuit element layer DP-CL may be formed by a process of forming an insulating layer, a semiconductor layer, and a conductive layer through a coating operation, a deposition operation, etc., and a process of patterning the insulating layer, the semiconductor layer, and the conductive layer through a photolithography operation.

The display element layer DP-OLED may include a light-emitting element. The display element layer DP-OLED may include organic light-emitting diodes. The display element layer DP-OLED may further include an organic layer such as a pixel defining layer.

The thin-film encapsulation layer TFE may encapsulate the display element layer DP-OLED. In an embodiment, the thin-film encapsulation layer TFE includes an insulating layer.

In an alternative embodiment, the thin-film encapsulation layer TFE may include an inorganic layer (hereinafter, referred to as an encapsulation inorganic layer).

In another alternative embodiment, the thin-film encapsulation layer TFE may include an organic layer (hereinafter, referred to as an encapsulation organic layer) and an encapsulation inorganic layer.

The encapsulation inorganic layer may protect the display element layer DP-OLED from external moisture or oxygen. The encapsulation organic layer may protect the display element layer DP-OLED from foreign material such as dust particles.

In an embodiment, the encapsulation inorganic layer may include a silicon nitride layer, silicon oxynitride layer, a silicon oxide layer, a titanium oxide layer, or an aluminum oxide layer, but not being limited thereto. Alternatively, the encapsulation organic layer may include an acrylic organic layer, but not being limited thereto.

In an embodiment, the thin-film encapsulation layer TFE may be formed by alternately stacking one or more organic film layers and one or more inorganic film layers. The uppermost layer exposed to the outside of the thin film encapsulation layer TFE may be formed of an inorganic layer to prevent moisture permeation to the display element layer.

The display panel DP may include a display pixel unit including a plurality of display pixels, signal lines, and a display driving unit configured to drive the display pixel unit.

The display pixel unit may be disposed in the display area DD-DA shown in FIG. 1.

The signal lines and the display driving unit may be disposed in the non-display area DD-NDA shown in FIG. 1.

Each of the display pixels may include an organic light-emitting diode and a pixel circuit connected to the organic light-emitting diode. The display driving unit, the signal lines, and the pixel circuit of the display pixel may be included in a circuit element layer DP-CL shown in FIG. 3.

The display driving unit may include a plurality of thin-film transistors formed through a same process as that of the pixel circuit of the display pixel, e.g., through a low temperature polycrystalline silicon ("LTPS") process or a low temperature polycrystalline oxide ("LTPO") process.

In an embodiment, a fingerprint sensor ISU may have a "layer" structure as described with reference to FIG. 2A. In such an embodiment, the fingerprint sensor ISU having the "layer" structure is directly disposed on the base surface provided by the display panel DP, so that a separate base layer is omitted unlike the fingerprint sensor ISU having a "panel" structure. Accordingly, in such an embodiment, the thickness of the display module DM may be reduced. In an embodiment, the base surface may be an upper surface of the thin-film encapsulation layer TFE.

The fingerprint sensor ISU may have a multilayer structure, in embodiments where the fingerprint sensor ISU has a "panel" structure or a "layer" structure.

The thickness of the thin-film encapsulation layer TFE may be adjusted to prevent the fingerprint sensor ISU from being affected by noise generated by components of the display element layer DP-OLED.

The fingerprint sensor ISU may include a sensing electrode, a signal line connected to the sensing electrode, and an insulating layer.

In an embodiment, the fingerprint sensor ISU may sense an external input by a capacitive sensing method. However, the operating method of the fingerprint sensor ISU is not limited to a particular method. In an alternative embodiment of the disclosure, the fingerprint sensor ISU may sense an external input by an electromagnetic induction method or a pressure sensing method.

In an embodiment, as shown in FIG. 3, the fingerprint sensor ISU may include a plurality of sensor pixels SP and a sensor insulating layer SIL.

The plurality of sensor pixels SP may be directly disposed on the thin-film encapsulation layer TFE. However, the disclosure is not limited thereto, and alternatively, the plurality of sensor pixels SP may be directly disposed on a separate sensor substrate formed on the thin-film encapsulation layer TFE.

The sensor insulating layer SIL may encapsulate the plurality of sensor pixels SP.

The sensor insulating layer SIL may have a single-layer or multilayer structure.

The sensor insulating layer SIL may include or be made of insulating material such as glass or resin.

The sensor insulating layer SIL may include an inorganic material, an organic material, or a composite material.

The sensor insulating layer SIL may include an inorganic layer. The inorganic layer may include at least one of aluminum oxide, titanium oxide, silicon oxide, silicon oxynitride, zirconium oxide, and hafnium oxide, for example.

The sensor insulating layer SIL may include an organic layer. The organic layer may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, and perylene-based resin, for example.

In an embodiment of the disclosure, the sensor insulating layer SIL may include or be made of material having flexibility to be bendable or foldable. In one embodiment, for example, the sensor insulating layer SIL may be a polymer layer, e.g., an acrylic polymer layer. In such an embodiment, even when the fingerprint sensor ISU is directly disposed on the display panel DP, the polymer layer may enhance the flexibility of the display device DD.

Figure 4:
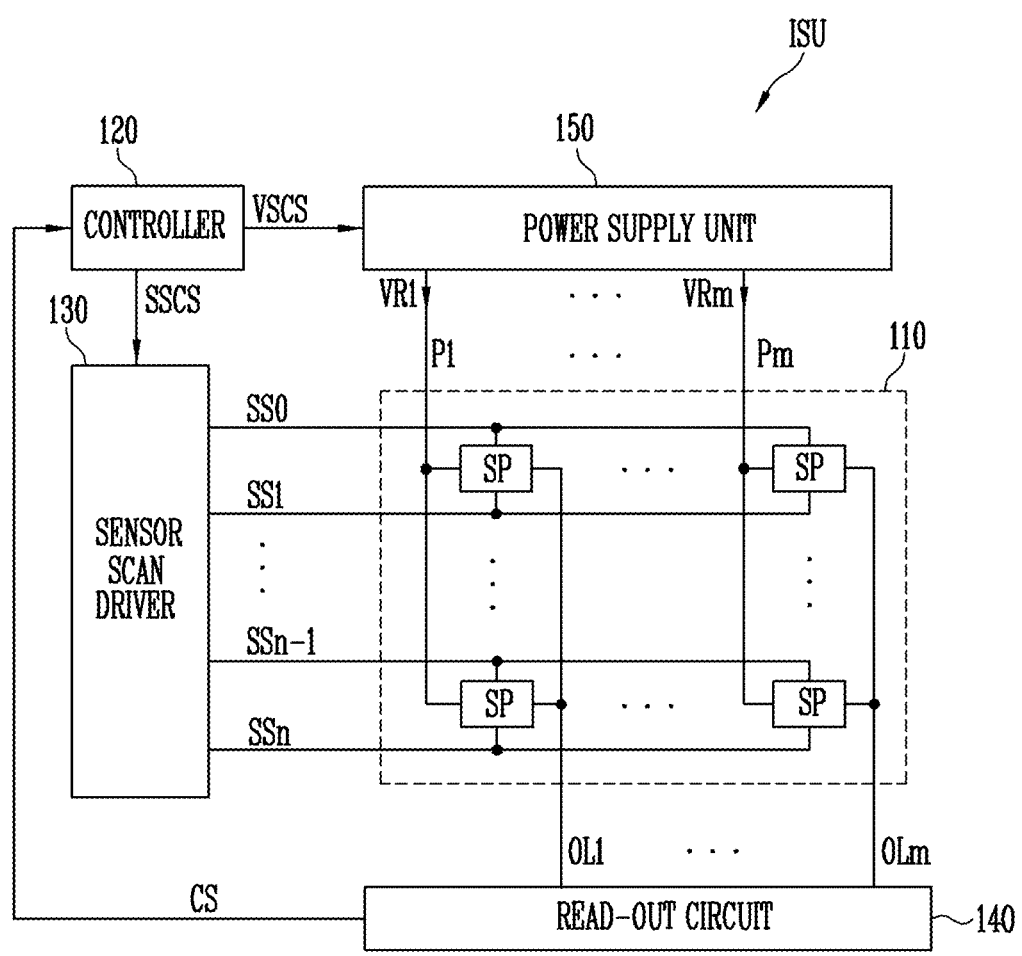
FIG. 4 is a diagram illustrating a fingerprint sensor in accordance with an embodiment of the disclosure.

FIG. 4 is a diagram illustrating a fingerprint sensor ISU in accordance with an embodiment of the disclosure.

In such an embodiment, the fingerprint sensor ISU may recognize a touch generated by a user.

Referring to FIGS. 3 and 4, an embodiment of the fingerprint sensor ISU may include a sensor pixel unit 110.

The sensor pixel unit 110 may include a plurality of sensor pixels SP and a sensor insulating layer SIL.

The sensor pixels SP may be connected to sensor scan lines SS0 to SSn, power lines P1 to Pm, and output lines OL1 to OLm. In one embodiment, for example, the sensor pixels SP may be arranged in the form of a matrix at intersections of power lines P1 to Pm and the sensor scan lines SS1 to SSn.

The sensor pixels SP may receive sensor scan signals through the sensor scan lines SS0 to SSn. The sensor pixels SP may output predetermined current corresponding to a touch state to the associated output lines OL1 to OLm during a sensor scan signal supply period.

The sensor scan lines SS0 to SSn, the power lines P1 to Pm, and the output lines OL1 to OLm may be disposed on the thin-film encapsulation layer TFE.

The sensor scan lines SS0 to SSn may extend in a first direction (e.g., an X-axis direction), and be connected to the sensor pixels SP on a first line basis (e.g. a horizontal line basis). That is, the sensor pixels SP arranged along the first line may constitute one first string. Each first string may be arranged spaced apart in a second direction (e.g., a Y-axis direction). Therefore, any one of the sensor scan lines SS0 to SSn may be electrically connected to the sensor pixels of one first string.

The power lines P1 to Pm may extend in the second direction (e.g., a Y-axis direction), and be connected to the sensor pixels SP on a second line basis (e.g. a vertical line basis). That is, the sensor pixels SP arranged along the second line may constitute one second string. Each second string may be arranged spaced apart in the first direction (e.g., a X-axis direction). Therefore, any one of the power lines P1 to Pm may be electrically connected to the sensor pixels of one second string.

The output lines OL1 to OLm may extend in the second direction (e.g., the Y-axis direction), and be connected to the sensor pixels SP on a second line basis. That is, any one of output lines OL1 to OLm may be electrically connected to the sensor pixels of one second string.

In one embodiment, for example, the power lines P1 to Pm may be arranged in parallel to the output lines OL1 to OLm. However, the arrangement direction of the power lines P1 to Pm may be changed in various forms, and alternatively, the power lines P1 to Pm may be arranged in parallel to, for example, the sensor scan lines SS0 to SSn.

The sensor pixels SP may receive reference voltages VR1 to VRm through the power lines P1 to Pm on a vertical line basis.

The power lines P1 to Pm may be electrically insulated or separated from each other to maintain different potentials by vertical lines.

The sensor insulating layer SIL may be used as a surface to receive a touch of the user, and may have a single-layer or multilayer structure.

In such an embodiment, the fingerprint sensor ISU may further include, for driving of the fingerprint sensor ISU, a controller 120, a sensor scan driver 130, a read-out circuit 140 and a power supply unit 150.

The controller 120 may control the sensor scan driver 130 and the power supply unit 150. The controller 120 may transmit a sensor-scan-driver control signal SSCS to the sensor scan driver 130.

The controller 120 may receive compensation information CS from the read-out circuit 140.

The controller 120 may adjust, based on the compensation information CS, the reference voltages VR1 to VRm on a vertical line basis.

In one embodiment, for example, the compensation information CS may include an average value of threshold voltages of sensor pixels SP coupled to each of the power lines P1 to Pm.

The controller 120 may adjust each of the reference voltages VR1 to VRm by adding or subtracting the corresponding average value to or from the reference voltage VR1 to VRm.

In an embodiment, the controller 120 may adjust a j-th reference voltage VRj (j is a natural number) by adding or subtracting an average value of threshold voltages corresponding to a j-th vertical line to or from a j-th reference voltage VRj to be supplied to a j-th power line Pj of the j-th vertical line.

Such adjustment will be described later in greater detail with reference to FIGS. 7 and 8.

The controller 120 may transmit a power-supply-unit control signal VSCS to the power supply unit 150 to supply adjusted reference voltages VR1 to VRm to the sensor pixels SP.

In one embodiment, for example, the power-supply-unit control signal VSCS may include information about the adjusted reference voltages VR1 to VRm.

The sensor scan driver 130 may supply sensor scan signals to the sensor pixels SP through the sensor scan lines SS0 to SSn, based on the sensor-scan-driver control signal SSCS received from the controller 120.

In one embodiment, for example, the sensor scan driver 130 may simultaneously or sequentially output sensor scan signals to the sensor scan lines SS0 to SSn, based on the sensor-scan-driver control signal SSCS.

The sensor scan signals may have voltage levels sufficient to turn on transistors which are supplied with the sensor scan signals.

In an embodiment, the sensor scan driver 130 may be disposed directly on the thin-film encapsulation layer TFE or directly on a separate sensor substrate to be connected to the sensor scan lines SS0 to SSn, or be connected to the sensor scan lines SS0 to SSn through a separate component such as a flexible printed circuit board.

The read-out circuit 140 may receive sensing signals (e.g., currents or voltages), which is outputted from the sensor pixels SP, through the output lines OL1 to OLm.

In one embodiment, for example, when the sensor scan driver 130 simultaneously supplies sensor scan signals, the sensor pixels SP of all of the horizontal lines are selected, and the read-out circuit 140 may receive, through the output lines OL1 to OLm, sensing signals outputted from the sensor pixels SP on a vertical line basis.

In one alternative embodiment, for example, when the sensor scan driver 130 sequentially supplies sensor scan signals, the sensor pixels SP are selected on a horizontal line basis, and the read-out circuit 140 may sequentially receive, through the output lines OL1 to OLm, sensing signals outputted from the sensor pixels SP on a vertical line basis.

In an embodiment, where the sensor scan driver 130 simultaneously supplies sensor scan signals, the read-out circuit 140 may detect, based on a sensing signal, an average value of the threshold voltages of the corresponding sensor pixels SP on a vertical line basis.

In one embodiment, for example, the read-out circuit 140 may detect threshold voltages of the sensor pixels SP on a vertical line basis by sensing a change in current or voltage.

The read-out circuit 140 may generate compensation information CS based on the detected threshold voltages and output the compensation information CS to the controller 120.

In one embodiment, for example, the compensation information CS may include an average value of threshold voltages of sensor pixels SP coupled to each of the power lines P1 to Pm.

In an embodiment, where the sensor scan driver 130 sequentially supplies sensor scan signals, the read-out circuit 140 may recognize current touch information based on a sensing signal. In one embodiment, for example, the read-out circuit 140 may recognize current touch information by sensing a change in current or voltage.

The touch information may include the location of a touch detected by the fingerprint sensor ISU, and information about at least one of valleys and ridges included in a fingerprint or a palm print.

In an embodiment, the read-out circuit 140 may be disposed directly on the thin-film encapsulation layer TFE or directly on a separate sensor substrate to be connected to the output lines OL1 to OLm, or may be connected to the output lines OL1 to OLm through a separate component such as a flexible printed circuit board.

The power supply unit 150 may supply, through the power lines P1 to Pm, reference voltages VR1 to VRm to the sensor pixels SP on a vertical line basis, in response to a power-supply-unit control signal VSCS received from the controller 120.

In an embodiment, the power supply unit 150 may be disposed directly on the thin-film encapsulation layer TFE or directly on a separate sensor substrate to be connected to the power lines P1 to Pm, or may be connected to the power lines P1 to Pm through a separate component such as a flexible printed circuit board.

In an embodiment, the fingerprint sensor ISU may further include a floating controller (not shown).

The floating controller may control voltages to be applied to the output lines OL1 to OLm, under the control of the controller 120. In one embodiment, for example, the floating controller may maintain the voltages to be applied to the output lines OL1 to OLm at a floating voltage higher than the reference voltages VR1 to VRm.

The floating controller may float the output lines OL1 to OLm, under the control of the controller 120. In one embodiment, for example, the floating controller may float the output lines OL1 to OLm by interrupting the supply of the floating voltage to the output lines OL1 to OLm.

The floating controller may float the output lines OL1 to OLm when the sensor scan driver 130 simultaneously supplies sensor scan signals.

In an embodiment, the floating controller may be a component integrated with the controller 120.

Although, the controller 120, the sensor scan driver 130, the read-out circuit 140 and the power supply unit 150 have been illustrated as being separately from one another in FIG. 4, embodiments are not limited thereto. Alternatively, at least some of the foregoing components may be integrated with each other if desired.

The sensor scan driver 130, the read-out circuit 140 and the power supply unit 150 may be installed by any one of various methods, such as a chip-on-glass method, chip-on-plastic method, a tape-carrier-package method, and a chip-on-film method.

Figure 5:
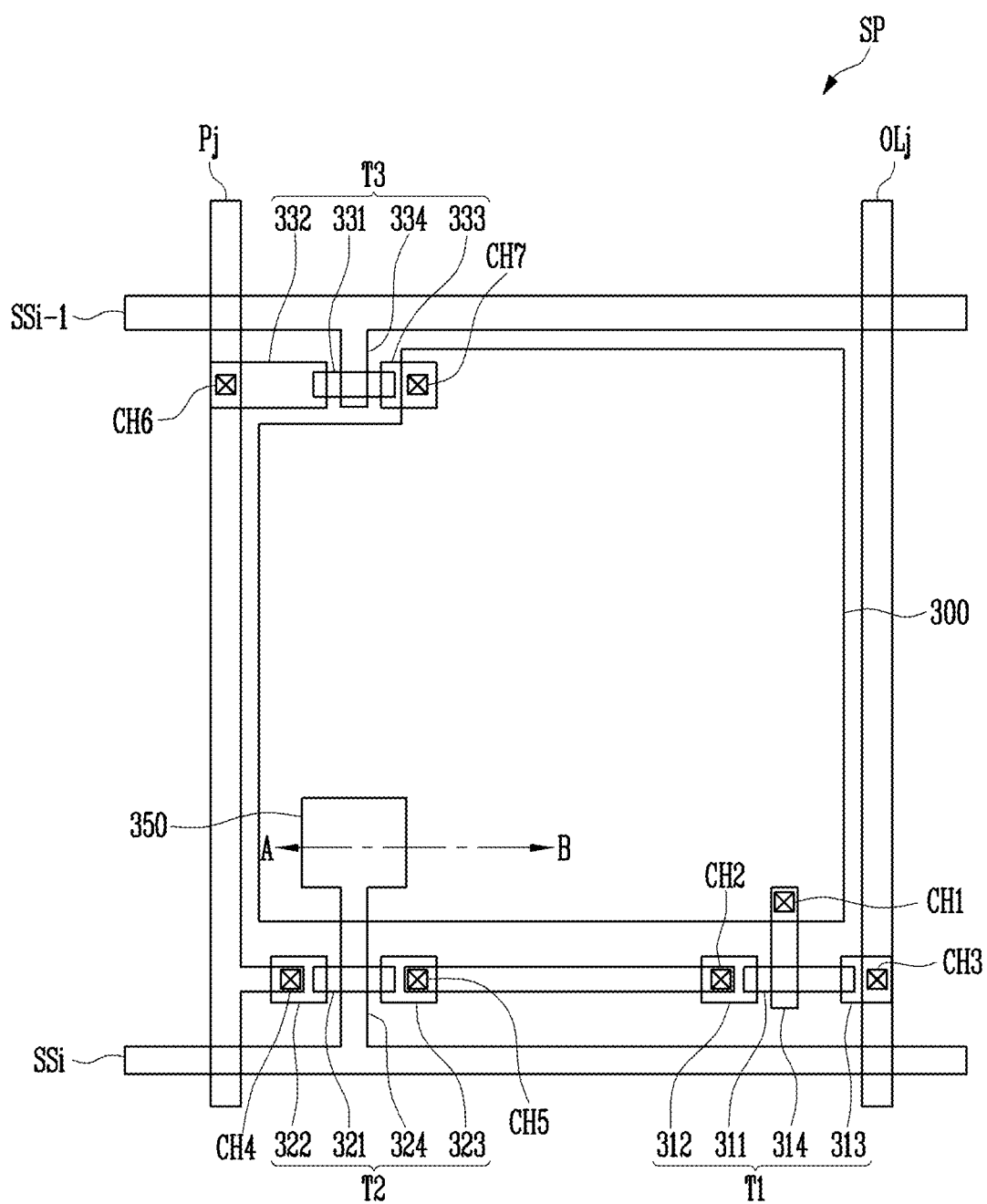
FIG. 5 is a plan view illustrating a sensor pixel in accordance with an embodiment of the disclosure.

FIG. 5 is a plan view illustrating a sensor pixel SP in accordance with an embodiment of the disclosure. For convenience of illustration and description, only a pixel coupled to an i-th sensor scan line SSi and a j-th output line OLj (where i is an integer of 2 or greater, and j is a natural number) is shown in FIG. 5.

Referring to FIG. 5, an embodiment of the sensor pixel SP may include a sensor electrode 300, a first transistor T1, a second transistor T2, a third transistor T3 and an auxiliary electrode 350.

The first transistor T1 may control a sensing signal to be outputted to the j-th output line OLj. In one embodiment, for example, the first transistor T1 may control a current flowing to the j-th output line OLj. In such an embodiment, the first transistor T1 may be connected between the j-th output line OLj and the second transistor T2.

In one embodiment, for example, the first transistor T1 may include a first electrode 312 connected to a second electrode 323 of the second transistor T2, a second electrode 313 connected to the j-th output line OLj, a gate electrode 314 connected to the sensor electrode 300, and a semiconductor layer 311 connected between the first electrode 312 and the second electrode 313.

The gate electrode 314, the first electrode 312, and the second electrode 313 of the first transistor T1 may be connected to other components through respective contact holes CH1, CH2, and CH3.

Therefore, the first transistor T1 may control a sensing signal (e.g., current) to be outputted to the j-th output line OLj in response to the potential of the sensor electrode 300.

The second transistor T2 may be connected between a j-th power line Pj and the first transistor T1.

In one embodiment, for example, the second transistor T2 may include a first electrode 322 coupled to the j-th power line Pj, a second electrode 323 connected to the first electrode 312 of the first transistor T1, a gate electrode 324 connected to the i-th sensor scan line SSi, and a semiconductor layer 321 connected between the first electrode 322 and the second electrode 323.

The first electrode 322 and the second electrode 323 of the second transistor T2 may be connected to other components through respective contact holes CH4 and CH5.

Therefore, the second transistor T2 may be turned on when a sensor scan signal is supplied to the i-th sensor scan line SSi. When the second transistor T2 is turned on, a j-th reference voltage VRj may be applied to the first electrode 312 of the first transistor T1.

The third transistor T3 may be connected between the j-th power line Pj and the sensor electrode 300.

In one embodiment, for example, the third transistor T3 may include a first electrode 332 connected to the j-th power line Pj, a second electrode 333 connected to the sensor electrode 300, a gate electrode 334 connected to an (i−1)-th sensor scan line SSi-1, and a semiconductor layer 331 connected between the first electrode 332 and the second electrode 333.

The first electrode 332 and the second electrode 333 of the third transistor T3 may be connected to other components through respective contact holes CH6 and CH7.

Therefore, the third transistor T3 may be turned on when a sensor scan signal is supplied to the (i−1)-th sensor scan line SSi-1. When the third transistor T3 is turned on, the voltage of the sensor electrode 300 may be initialized to the j-th reference voltage VRj.

The auxiliary electrode 350 may be disposed to overlap the sensor electrode 300, and may thus form a capacitor with the sensor electrode 300.

The auxiliary electrode 350 may be connected to the i-th sensor scan line SSi. In one embodiment, for example, the auxiliary electrode 350 may be connected to the i-th sensor scan line SSi through the gate electrode 324 of the second transistor T2.

In an embodiment, the auxiliary electrode 350 and the gate electrode 324 of the second transistor T2 may include or be made of a same material as that of the i-th sensor scan line SSi.

The sensor electrode 300 may form a capacitor with the auxiliary electrode 350 and the finger or the like of the user.

The sensor electrode 300 may include a conductive material. In one embodiment, for example, the conductive material may include a metal, a metal alloy, a conductive polymer, or transparent conductive material.

In such an embodiment, the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, or lead, for example.

In such an embodiment, the conductive polymer may include polythiophene, polypyrrole, polyaniline, polyacetylene and polyphenylene compounds, or a combination thereof, for example. In one embodiment, for example, a poly-3,4-ethylenedioxythiophene/polystyrenesulfonate ("PEDOT/PSS") compound of the polythiophene conductive polymer may be used to form the sensor electrode 300.

In such an embodiment, the transparent conductive material may include silver nanowires ("AgNW"), indium tin oxide ("ITO"), indium zinc oxide ("IZO"), antimony zinc oxide ("AZO"), indium tin zinc oxide ("ITZO"), zinc oxide (ZnO), tin oxide ($SnO_2$), a carbon nanotube, or a grapheme, for example.

Figure 6A:
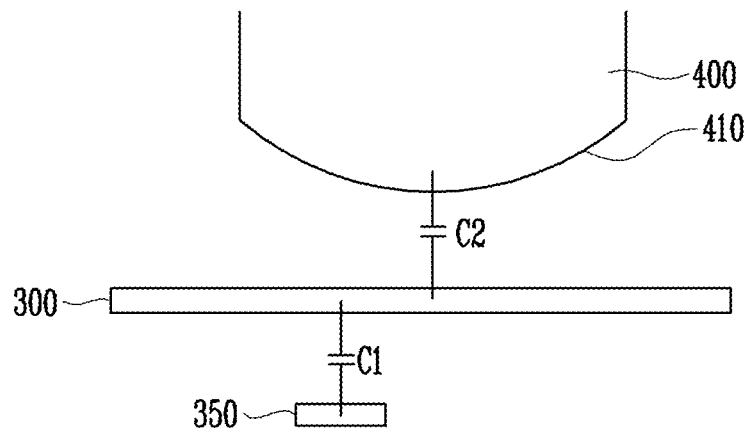
FIGS. 6A and 6B are diagrams illustrating a change in capacitance of a second capacitor related to the sensor electrode depending on whether on a ridge and a valley of a fingerprint.
Figure 6B:
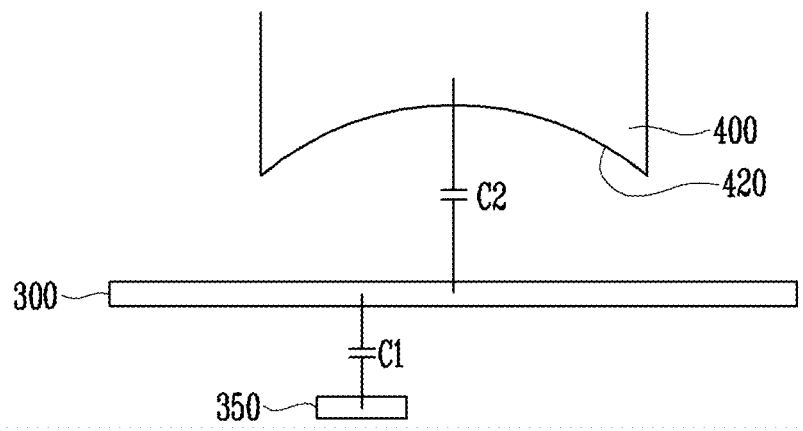

FIGS. 6A and 6B are diagrams illustrating a change in capacitance of a second capacitor related to the sensor electrode 300 when a ridge or a valley of a fingerprint is disposed thereabove.

In particular, FIG. 6A illustrates a case where a ridge 410 of a finger 400 is positioned on a sensor pixel SP, and FIG. 6B illustrates a case where a valley 420 of the finger 400 is positioned on the sensor pixel SP.

Referring to FIGS. 6A and 6B, the sensor electrode 300 and the auxiliary electrode 350 may form a first capacitor C1. The sensor electrode 300 and the auxiliary electrode 350 may be spaced apart from each other, and an insulating layer (not shown) may be interposed therebetween.

When the finger 400 of the user is placed on the sensor pixel SP, the sensor electrode 300 and the finger 400 may form a second capacitor C2 to recognize the fingerprint of the user.

Here, the second capacitor C2 is a variable capacitor, the capacitance of which may vary depending on whether the ridge 410 or valley 420 of the fingerprint is placed on the sensor electrode 300.

Since the distance between the ridge 410 and the sensor electrode 300 is shorter than the distance between the valley 420 and the sensor electrode 300, the capacitance of the second capacitor C2 in the case where the ridge 410 is placed on the sensor electrode 300, as illustrated in FIG. 6A, and the capacitance of the second capacitor C2 in the case where the valley 420 is placed on the sensor electrode 300, as illustrated in FIG. 6B, may differ from each other.

A change in capacitance of the second capacitor C2 may affect even a sensing signal (e.g., current) of the sensor pixel SP. Hence, the read-out circuit (not shown) may recognize the fingerprint of the user based on the sensing signal. In one embodiment, for example, the read-out circuit (not shown) may recognize the fingerprint of the user by sensing a change in current or voltage.

Figure 7:
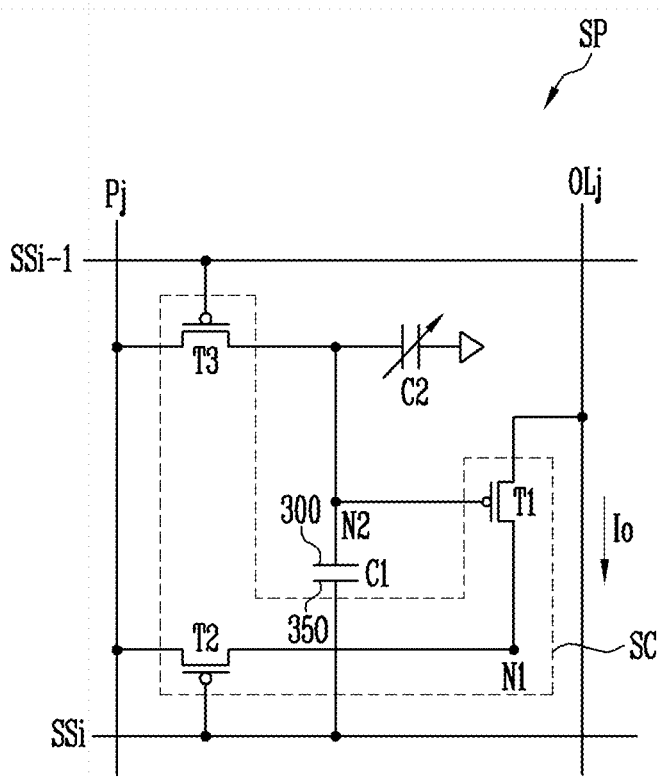
FIG. 7 is a diagram illustrating an equivalent circuit of an embodiment of the sensor pixel shown in FIG. 5.

FIG. 7 is a diagram illustrating an equivalent circuit of an embodiment of the sensor pixel SP shown in FIG. 5. FIG. 8 is a waveform diagram illustrating the operation of the sensor pixel SP shown in FIG. 7.

For convenience of illustration and description, only a sensor pixel SP coupled to the j-th output line OLj among the sensor pixels coupled to the i-th sensor scan line SSi and the (i−1)-th sensor scan lines SSi-1 is illustrated in FIG. 7. In FIG. 8, a sensor scan signal that is supplied to the (i−1)-th sensor scan line SSi-1 and a sensor scan signal that is supplied to the i-th sensor scan line SSi are illustrated.

Referring to FIG. 7, an embodiment of the sensor pixel SP may include a sensor electrode 300, an auxiliary electrode 350, a first transistor T1, a second transistor T2 and a third transistor T3.

In such an embodiment, as described above, the sensor electrode 300 and the auxiliary electrode 350 may constitute the first capacitor C1. The first transistor T1, the second transistor T2 and the third transistor T3 may collectively define a sensor circuit SC.

The second capacitor C2, which is a variable capacitor, may be formed by the sensor electrode 300 and the finger 400, as described above. Here, the capacitance of the second capacitor C2 may change depending on the distance between the sensor electrode 300 and the finger 400, whether the valley or the ridge of a fingerprint is placed on the sensor electrode 300, the magnitude of pressure applied by a touch, or the like.

The first transistor T1 may control a sensing signal (e.g., a current) to be outputted to the j-th output line OLj. In an embodiment, the first transistor T1 may be connected between the j-th output line OLj and the second transistor T2 to control the sensing signal to be outputted to the j-th output line OLj.

In such an embodiment, the first transistor T1 may be connected between the j-th output line OLj and a first node N1, and the gate electrode thereof may be connected to a second node N2.

In one embodiment, referring to FIGS. 5 and 7, for example, the first transistor T1 may include a first electrode connected to a second electrode of the second transistor T2, a second electrode connected to the j-th output line OLj, and a gate electrode coupled to the sensor electrode 300.

The second transistor T2 may be connected between a j-th power line Pj and the first transistor T1. In an embodiment, the second transistor T2 may be connected between the j-th power line Pj and the first node N1, and the gate electrode thereof may be connected to the i-th sensor scan line SSi.

In one embodiment, for example, the second transistor T2 may include a first electrode connected to the j-th power line Pj, a second electrode connected to the first electrode of the first transistor T1, and a gate electrode connected to the i-th sensor scan line SSi.

Therefore, the second transistor T2 may be turned on when a sensor scan signal is supplied to the i-th sensor scan line SSi. When the second transistor T2 is turned on, a j-th reference voltage VRj may be applied to the first electrode 312 of the first transistor T1.

The third transistor T3 may be connected between the j-th power line Pj and the sensor electrode 300.

In such an embodiment, the third transistor T3 may be connected between the second node N2 and the j-th power line Pj, and the gate electrode thereof may be connected to the (i−1)-th sensor scan line SSi-1.

In one embodiment, for example, the third transistor T3 may include a first electrode connected to the j-th power line Pj, a second electrode connected to the sensor electrode 300, and a gate electrode coupled to the (i−1)-th sensor scan line SSi-1.

Therefore, in such an embodiment, the third transistor T3 may be turned on when a sensor scan signal is supplied to the (i−1)-th sensor scan line SSi-1. When the third transistor T3 is turned on, the voltage of the sensor electrode 300 may be initialized to the j-th reference voltage VRj.

The auxiliary electrode 350 may be disposed to overlap the sensor electrode 300, and may thus form a first capacitor C1 with the sensor electrode 300.

The auxiliary electrode 350 may be connected to the i-th sensor scan line SSi.

Hence, the first capacitor C1 may be connected between the second node N2 and the i-th sensor scan line SSi.

The second capacitor C2 may be connected to the second node N2.

The first node N1 is a node to which the first electrode of the first transistor T1 and the second electrode of the second transistor T2 are connected in common. The second node N2 is a node to which the sensor electrode 300, the gate electrode of the first transistor T1, and the second electrode of the third transistor T3 are commonly connected.

Here, the first electrode of each of the transistors T1, T2, and T3 may be set to any one of a source electrode and a drain electrode, and the second electrode of each of the transistors T1, T2, and T3 may be set to an electrode different from the first electrode. In one embodiment, for example, if the first electrode is set to a source electrode, the second electrode may be set to a drain electrode.

In an embodiment, as shown in FIG. 7, the transistors T1, T2, and T3 are p-type metal-oxide-semiconductor ("PMOS") transistors, but not being limited thereto. In an alternative embodiment, the transistors T1, T2, and T3 may be n-type metal-oxide-semiconductor ("NMOS") transistors.

Figure 8:
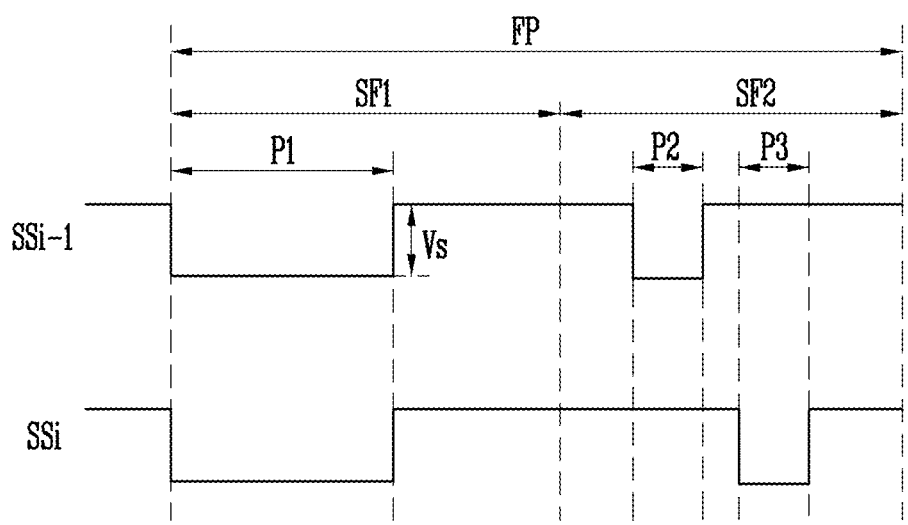
FIG. 8 is a waveform diagram for explaining the operation of the sensor pixel shown in FIG. 7.

Referring to FIGS. 4, 7 and 8, one frame period FP may include a first sub-period SF1 and a second sub-period SF2.

The first sub-period SF1 may include a first period P1, and the second sub-period SF2 may include a second period P2 and a third period P3.

During the first sub-period SF1, the j-th reference voltage VRj may be supplied to the j-th power line Pj. During the first period P1, the j-th output line OLj may float, and sensor scan signals may be simultaneously supplied to the (i−1)-th sensor scan line SSi-1 and the i-th sensor scan line SSi.

Therefore, during the first period P1, the second transistor T2 and the third transistor T3 may be in a turn-on state, and the first node N1 and the second node N2 may be initialized to the j-th reference voltage VRj that is applied thereto from the j-th power line Pj though the turned-on second and third transistors T2 and T3.

Here, a sensing signal may be outputted to the j-th output line OLj.

The read-out circuit 140 may detect a threshold voltage of the first transistor T1 based on the sensing signal.

In one embodiment, for example, the read-out circuit 140 may detect threshold voltages of the first transistors T1 included in the sensor pixels SP on a vertical line basis by sensing a change in current or voltage.

The read-out circuit 140 may generate compensation information CS based on the detected threshold voltages and output it to the controller 120.

In one embodiment, for example, the compensation information CS may include an average value of the threshold voltages of the first transistors T1 included in the sensor pixels SP connected to each of the power lines P1 to Pm.

The controller 120 may adjust the j-th reference voltage VRj to be supplied to the j-th power line Pj, based on the compensation information CS.

In an embodiment, the controller 120 may adjust the j-th reference voltage VRj by adding or subtracting the average value of the threshold voltages corresponding to the j-th vertical line to or from the j-th reference voltage VRj to be supplied to the j-th power line Pj of the j-th vertical line.

Subsequently, during the second sub-period SF2, the controller 120 may transmit a power-supply-unit control signal VSCS to the power supply unit 150 to supply the adjusted reference voltage VRj to the sensor pixels SP.

The power supply unit 150 may supply the adjusted j-th reference voltage VRj to the j-th power line Pj, based on the power-supply-unit control signal VSCS.

During the second period P2, the voltage of the j-th output line OLj may be maintained at a certain voltage, and a sensor scan signal may be supplied to the (i−1)-th sensor scan line SSi-1.

Therefore, during the second period P2, the third transistor T3 may be in a turn-on state, and the second node N2 may be initialized to the adjusted j-th reference voltage Vj that is applied from the j-th power line Pj.

During the third period P3, a sensor scan signal may be supplied to the i-th sensor scan line SSi.

Therefore, during the third period P3, the second transistor T2 may be in a turn-on state, and a sensing signal (e.g., output current Io) may be outputted from the j-th power line Pj to the j-th output line OLj through the second transistor T2 and the first transistor T1.

In such an embodiment, the first transistor T1 may control the amount of output current Io in response to a gate voltage (i.e., the voltage of the second node N2).

In one embodiment, for example, the output current Io may change depending on the gate voltage (Vg) of the first transistor T1, and the gate voltage (Vg) of the first transistor T1 may be determined by the following equation: Vg=VRj+{Vc1/(Vc1+Vc2)}×Vs.

In the equation above, VRj denotes the reference voltage, Vc1 denotes the capacitance of the first capacitor C1, Vc2 denotes the capacitance of the second capacitor C2, and Vs denotes a change in voltage of the sensor scan signal that is supplied to the i-th sensor scan line SSi.

Figure 9:
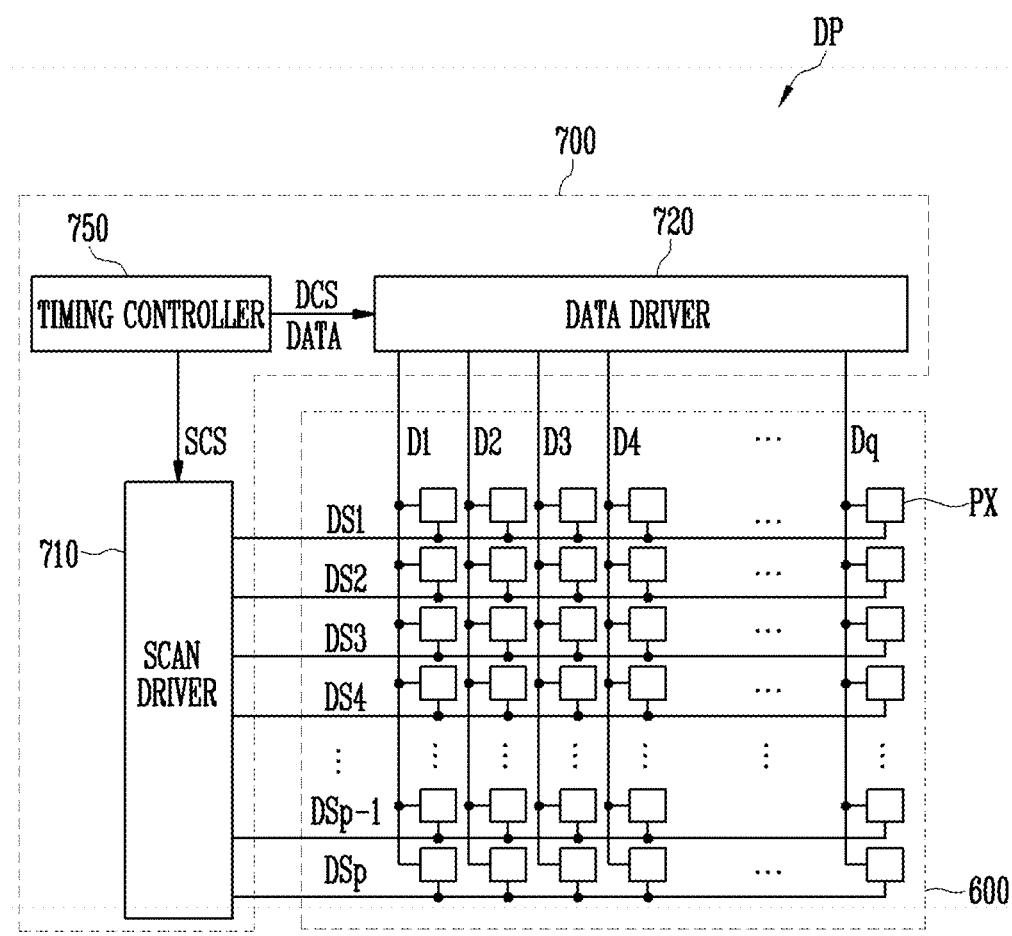
FIG. 9 is a diagram illustrating a display pixel unit and a display driving unit in accordance with an embodiment of the disclosure.

FIG. 9 is a diagram illustrating a display panel DP in accordance with an embodiment of the invention.

Referring to FIGS. 3 and 9, an embodiment of the display panel DP may include a display pixel unit 600 and a display driving unit 700.

The display pixel unit 600 may include display pixels PX.

The display pixels PX may be connected to data lines D1 to Dq and display scan lines DS1 to DSp. In one embodiment, for example, the display pixels PX may be arranged in the form of a matrix at intersections of the data lines D1 to Dq and the display scan lines DS1 to DSp.

The display pixels PX may be supplied with data signals and display scan signals through the data lines D1 to Dq and the display scan lines DS1 to DSp.

Each display pixel PX may include a light-emitting element (e.g., an organic light-emitting diode), and generate light corresponding to a data signal by a current flowing from a first power source ELVDD to a second power source ELVSS via the light-emitting element.

The display driving unit 700 may include a scan driver 710, a data driver 720, and a timing controller 750.

The scan driver 710 may provide display scan signals to the display scan lines DS1 to DSp in response to a scan driver control signal SCS. In one embodiment, for example, the scan driver 710 may sequentially supply display scan signals to the display scan lines DS1 to DSp.

In an embodiment, the scan driver 710 may be directly mounted on a substrate (not shown) or may be coupled to the base layer BL through a separate component such as a flexible printed circuit board to be connected to the display scan lines DS1 to DSp.

The data driver 720 may receive a data driver control signal DCS and image data DATA from the timing controller 750 and then generate data signals.

The data driver 720 may supply generated data signals to the data lines D1 to Dq.

In an embodiment, the scan driver 710 may be directly mounted on a substrate (not shown) or may be coupled to the base layer BL through a separate component such as a flexible printed circuit board to be connected to the display scan lines DS1 to DSp.

When a display scan signal is provided through a certain display scan line, some display pixels PX connected to the certain display scan line may be supplied with data signals transmitted from the data lines D1 to Dq and may emit light at luminance levels corresponding to the supplied data signals.

The timing controller 750 may generate control signals for controlling the scan driver 710 and the data driver 720.

In one embodiment, for example, the control signals may include a scan driver control signal SCS for controlling the scan driver 710, and a data driver control signal DCS for controlling the data driver 720.

The timing controller 750 may provide the scan driver control signal SCS to the scan driver 710 and provide the data driver control signal DCS to the data driver 720.

The timing controller 750 may convert the image data DATA to correspond to the specifications of the data driver 720 and may provide the converted data to the data driver 720.

In an embodiment, as shown in FIG. 9, the scan driver 710, the data driver 720 and the timing controller 750 may be separately provided, but not being limited thereto. In an alternative embodiment, at least some of the scan driver 710, the data driver 720 and the timing controller 750 may be integrated with each other, as desired.

The scan driver 710, the data driver 720 and the timing controller 750 may be installed by any one of various methods, such as a chip-on-glass method, a chip-on-plastic method, a tape-carrier-package method, and a chip-on-film method.

Figure 10A:
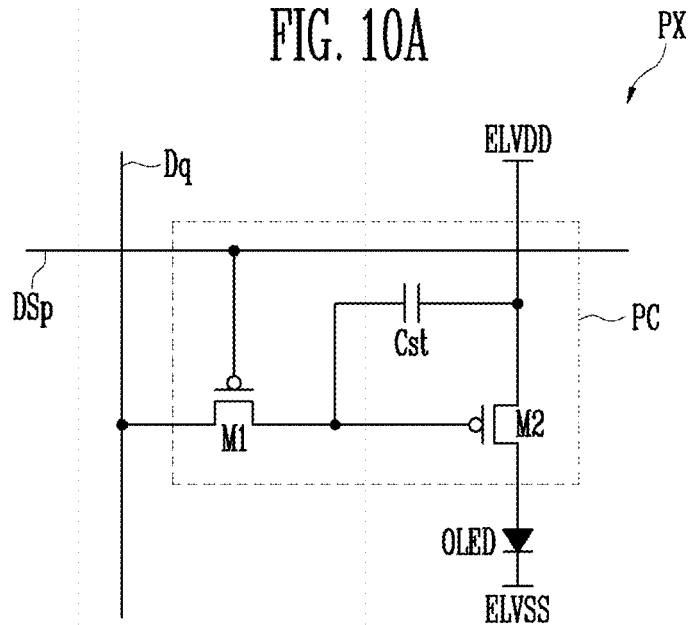
FIGS. 10A and 10B are diagrams illustrating embodiments of the display pixel shown in FIG. 9.
Figure 10B:
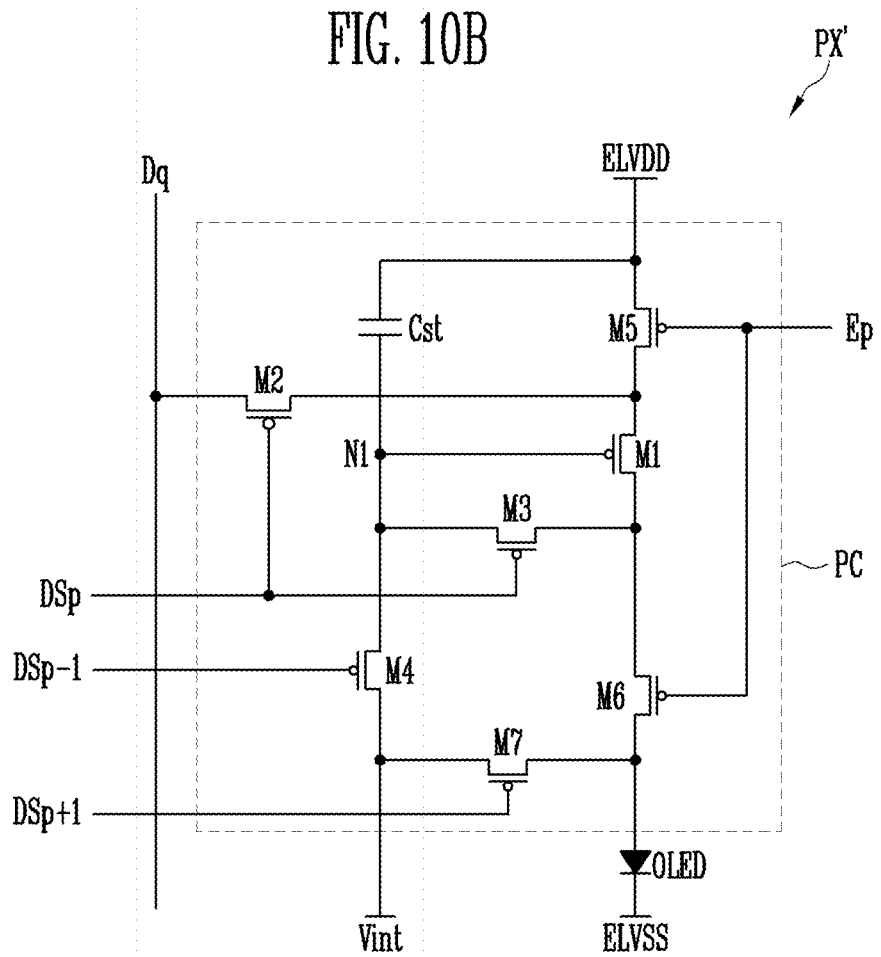

FIGS. 10A and 10B are diagrams illustrating embodiments of the display pixel PX shown in FIG. 9. For convenience of illustration and description, FIGS. 10A and 10B respectively illustrate display pixels PX and PX' which are connected with a p-th display scan line DSp and a q-th data line Dq. FIGS. 10A and 10B show embodiments where the light-emitting element of the display pixel PX, PX' is an organic light-emitting diode OLED.

Referring to FIG. 10A, an embodiment of the display pixel PX may include an organic light-emitting diode OLED, and a pixel circuit PC which is connected to the q-th data line Dq and the p-th display scan line DSp to control the organic light-emitting diode OLED.

An anode electrode of the organic light-emitting diode OLED may be connected to the pixel circuit PC, and a cathode electrode thereof may be connected to the second power source ELVSS.

The organic light-emitting diode OLED may emit light having a predetermined luminance corresponding to current supplied from the pixel circuit PC.

The pixel circuit PC may store a data signal to be supplied to the q-th data line Dq when a display scan signal is supplied to the p-th display scan line DSp. The pixel circuit PC may control current to be supplied to the organic light-emitting diode OLED in response to the stored data signal.

In one embodiment, for example, the pixel circuit PC may include a first transistor M1, a second transistor M2, and a storage capacitor Cst.

The first transistor M1 may be connected between the q-th data line Dq and the second transistor M2.

In one embodiment, for example, a gate electrode of the first transistor M1 may be connected to the p-th display scan line DSp, a first electrode thereof may be connected to the q-th data line Dq, and a second electrode thereof may be connected to a gate electrode of the second transistor M2.

When a display scan signal is supplied from the p-th display scan line DSp, the first transistor M1 is turned on such that a data signal is supplied from the q-th data line Dq to the storage capacitor Cst.

Here, the storage capacitor Cst may charge voltage corresponding to the data signal.

The second transistor M2 may be connected between the first power source ELVDD and the organic light-emitting diode OLED.

In one embodiment, for example, the gate electrode of the second transistor M2 may be connected both to a first electrode of the storage capacitor Cst and to the second electrode of the first transistor M1. A first electrode of the second transistor M2 may be connected both to a second electrode of the storage capacitor Cst and to the first power source ELVDD. A second electrode of the second transistor M2 may be connected to the anode electrode of the organic light-emitting diode OLED.

The second transistor M2 may function as a driving transistor and control the current flowing from the first power source ELVDD to the second power source ELVSS via the organic light-emitting diode OLED in response to a voltage stored in the storage capacitor Cst.

Here, the organic light-emitting diode OLED may generate light corresponding to current supplied from the second transistor M2.

The first electrode of each transistor M1, M2 may be one of a source electrode and a drain electrode. The second electrode of each transistor M1, M2 may be the other of the source electrode and the drain electrode. In one embodiment, for example, where the first electrode is a source electrode, the second electrode may be a drain electrode.

FIG. 10A shows an embodiment where the transistors M1 and M2 are PMOS transistors, but not being limited thereto. In an alternative embodiment, the transistors M1 and M2 may be NMOS transistors.

Referring to FIG. 10B, an alternative embodiment of the display pixel PX' may include an organic light-emitting diode OLED, and a pixel circuit PC configured to control the organic light-emitting diode OLED.

The anode electrode of the organic light-emitting diode OLED may be connected to the pixel circuit PC, and the cathode electrode thereof may be connected to the second power source ELVSS.

The pixel circuit PC may include first to seventh transistors M1 to M7 and a storage capacitor Cst.

The anode electrode of the organic light-emitting diode OLED may be connected to the first transistor M1 via the sixth transistor M6, and the cathode electrode thereof may be connected to the second power source ELVSS. The organic light-emitting diode OLED may emit light having a predetermined luminance corresponding to a current supplied thereto from the first transistor M1.

The first power source ELVDD may be a voltage higher than that of the second power source ELVSS to allow a current to flow to the organic light-emitting diode OLED.

The seventh transistor M7 may be connected between an initialization power source Vint and the anode electrode of the organic light-emitting diode OLED. A gate electrode of the seventh transistor M7 may be connected to a (p+1)-th display scan line DSp+1. When a display scan signal is supplied to the (p+1)-th display scan line DSp+1, the seventh transistor M7 is turned on such that the voltage of the initialization power source Vint may be supplied to the anode electrode of the organic light-emitting diode OLED. The initialization power source Vint may be a voltage lower than that of the data signal.

The sixth transistor M6 may be connected between the first transistor M1 and the organic light-emitting diode OLED. A gate electrode of the sixth transistor M6 may be connected to a p-th emission control line Ep. The sixth transistor M6 may be turned off when an emission control signal is supplied to the p-th emission control line Ep, and be turned on otherwise.

The fifth transistor M5 may be connected between the first power source ELVDD and the first transistor M1. A gate electrode of the fifth transistor M5 may be connected to the p-th emission control line Ep. The fifth transistor M5 may be turned off when an emission control signal is supplied to the p-th emission control line Ep, and be turned on otherwise.

A first electrode of the first transistor M1, which may be a driving transistor, may be connected to the first power source ELVDD via the fifth transistor M5, and a second electrode thereof may be connected to the anode electrode of the organic light-emitting diode OLED via the sixth transistor M6. A gate electrode of the first transistor M1 may be connected to a first node N1. The first transistor M1 may control the current flowing from the first power source ELVDD to the second power source ELVSS via the organic light-emitting diode OLED in response to the voltage of the first node N1.

The third transistor M3 may be connected between a second electrode of the first transistor M1 and the first node N1. A gate electrode of the third transistor M3 may be connected to the p-th display scan line DSp. When a display scan signal is supplied to the p-th display scan line DSp, the third transistor M3 may be turned on so that the second electrode of the first transistor M1 can be electrically connected with the first node N1. Therefore, when the third transistor M3 is turned on, the first transistor M1 may be connected in the form of a diode.

The fourth transistor M4 may be connected between the first node N1 and the initialization power source Vint. A gate electrode of the fourth transistor M4 may be connected to a (p−1)-th display scan line DSp-1. When a display scan signal is supplied to the (p−1)-th display scan line DSp-1, the fourth transistor M4 is turned on such that the voltage of the initialization power source Vint may be supplied to the first node N1.

The second transistor M2 may be connected between the q-th data line Dq and the first electrode of the first transistor M1. A gate electrode of the second transistor M2 may be connected to the p-th display scan line DSp. When a display scan signal is supplied to the p-th display scan line DSp, the second transistor M2 may be turned on such that the first electrode of the first transistor M1 may be electrically connected with the q-th data line Dq.

The storage capacitor Cst may be connected between the first power source ELVDD and the first node N1. The storage capacitor Cst may store a voltage corresponding both to a data signal and a threshold voltage of the first transistor M1.

The first electrode of each transistor M1, M2, M3, M4, M5, M6, M7 may be one of a source electrode and a drain electrode. The second electrode of each transistor M1, M2, M3, M4, M5, M6, M7 may be the other of the source electrode and the drain electrode. In one embodiment, for example, where the first electrode is a source electrode, the second electrode may be a drain electrode.

FIG. 10B shows an embodiment where the transistors M1, M2, M3, M4, M5, M6, and M7 are PMOS transistors, but not being limited thereto. In an alternative embodiment, the transistors M1, M2, M3, M4, M5, M6, and M7 may be NMOS transistors.

In embodiments of the invention, the structure of the display pixel is not limited to the structure of the display pixel PX, PX' described above with reference to FIGS. 10A and 10B. In such embodiments, any one of various well-known pixel structures may be selected as the structure of the display pixel, so long as the display pixel has a circuit structure capable of supplying current to the organic light-emitting diode OLED.

The first power source ELVDD may be a high-potential power source, and the second power source ELVSS may be a low-potential power source.

In one embodiment, for example, the first power source ELVDD may be a positive voltage, and the second power source ELVSS may be a negative voltage or ground voltage.

FIG. 11 is a flowchart illustrating a method of operating a fingerprint sensor in accordance with an embodiment of the disclosure. Hereinafter, an embodiment of the method of operating the fingerprint sensor will be described with reference to FIGS. 4, 7, 8, and 11.

In such an embodiment, the threshold voltage of the first transistor T1 included in each of the sensor pixels SP may be detected (S10). In one embodiment, for example, the read-out circuit 140 may detect the threshold voltages of the first transistors T1 included in the respective sensor pixels SP on a vertical line basis.

In such an embodiment, the reference voltages VR1 to VRm may be adjusted on a vertical line basis (S20) based on the threshold voltage of the first transistor T1 included in each of the sensor pixels SP detected by the read-out circuit 140. In one embodiment, for example, the controller 120 may adjust the j-th reference voltage VRj to be supplied to the j-th power line Pj.

In such an embodiment, the adjusted reference voltages VR1 to VRm may be supplied to the power lines P1 to Pm (S30). In one embodiment, for example, the power supply unit 150 may supply the adjusted j-th reference voltage VRj to the j-th power line Pj, under the control of the controller 120.

In such an embodiment, sensor scan signals may be sequentially supplied to the sensor scan lines SS1 to SSn (S40).

FIG. 12 is a flowchart illustrating an embodiment of the detecting the threshold voltage shown in FIG. 11. Hereinbelow, the step of detecting the threshold voltage will be described in detail with reference to FIGS. 4, 7, 8, 11, and 12.

In an embodiment, reference voltages VR1 to VRm may be supplied to the power lines P1 to Pm (S110).

In such an embodiment, the output lines OL1 to OLm may float (S120).

In such an embodiment, sensor scan signals may be simultaneously supplied to the sensor scan lines SS1 to SSn (S130).

In one embodiment, for example, during the first sub-period SF1, the j-th reference voltage VRj may be supplied to the j-th power line Pj. During the first period P1, the j-th output line OLj may float. Furthermore, sensor scan signals may be simultaneously supplied to the (i−1)-th sensor scan line SSi-1 and the i-th sensor scan line SSi.

In such an embodiment, sensing signals may be outputted through the output lines OL1 to Olm (S140).

In such an embodiment, the threshold voltage of the first transistor T1 included in each of the sensor pixels SP may be detected, and compensation information CS about the threshold voltage of the first transistor T1 may be generated based on the sensing signals (S150). In one embodiment, for example, the compensation information CS may include an average value of the threshold voltages of the first transistors T1 included in the sensor pixels SP connected to each of the power lines P1 to Pm.

As described above, embodiments of the disclosure may provide a fingerprint sensor, a display device including the fingerprint sensor, and a method of operating the fingerprint sensor, which may enhance a fingerprint sensing sensitivity by compensating for a difference in threshold voltage between sensor pixels.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A fingerprint sensor comprising:
   sensor pixels, each including a first transistor which controls a sensing signal to be outputted to a corresponding one of output lines;
   power lines disposed on a vertical line basis and each coupled to sensor pixels disposed on a corresponding vertical line;
   a power supplier electrically connected to the power lines;
   a read-out circuit which receives sensing signals outputted from the sensor pixels through the output lines electrically connected to the sensor pixels, detects threshold voltages of the first transistors based on the sensing signals, and generates compensation information, and
   a controller which adjusts reference voltages on the vertical line basis based on the compensation information,
   wherein
   the reference voltages are adjusted on the vertical line basis based on the threshold voltages of the first transistors, and
   the power supplier supplies the adjusted reference voltages to the power lines.

2. The fingerprint sensor according to claim 1, wherein the compensation information includes an average value of the threshold voltages of the first transistors of the sensor pixels electrically connected to each of the power lines.

3. The fingerprint sensor according to claim 2, wherein the controller adjusts each of the reference voltages by adding or subtracting the corresponding average value to or from the reference voltage.

4. The fingerprint sensor according to claim 1, further comprising
   a sensor scan driver which supplies sensor scan signals to sensor scan lines electrically connected to the sensor pixels.

5. The fingerprint sensor according to claim 4, wherein
   the sensor scan driver simultaneously supplies the sensor scan signals to the sensor scan lines during a first sub-period,
   the sensor scan driver sequentially supplies the sensor scan signals to the sensor scan lines during a second sub-period subsequent to the first sub-period, and
   a frame period includes the first sub-period and the second sub-period.

6. The fingerprint sensor according to claim 4, wherein
   a sensor pixel, which is electrically connected to an i-th sensor scan line of the sensor scan lines and a j-th output line of the output lines, comprises:
   a sensor circuit; and
   a first capacitor including a sensor electrode and an auxiliary electrode,
   wherein i and j are natural numbers,
   the sensor circuit comprises:
   the first transistor including a gate electrode electrically connected to the sensor electrode;
   a second transistor electrically connected between a j-th power line of the power lines and the first transistor; and
   a third transistor electrically connected between the j-th power line and the sensor electrode, and
   wherein the auxiliary electrode of the first capacitor is electrically connected to the i-th sensor scan line.

7. The fingerprint sensor according to claim 6, wherein
a gate electrode of the second transistor is electrically connected to the i-th sensor scan line, and
a gate electrode of the third transistor is electrically connected to an (i-1)-th sensor scan line of the sensor scan lines.

8. The fingerprint sensor according to claim 6, wherein when a touch of a hand of a user occurs on the fingerprint sensor, the sensor electrode forms a second capacitor with the hand of the user, and recognizes a fingerprint or a palm print of the user based on a change in capacitance of the second capacitor corresponding to the touch.

9. A display device comprising:
a display panel which displays an image; and
a fingerprint sensor disposed on the display panel, wherein the finger print sensor senses a fingerprint,
wherein the fingerprint sensor comprises:
   sensor pixels, each including a first transistor which controls a sensing signal to be outputted to a corresponding one of output lines;
   power lines disposed on a vertical line basis and each electrically connected to sensor pixels disposed on a corresponding vertical line;
   a power supplier electrically connected to the power lines,
   a read-out circuit which receives sensing signals outputted from the sensor pixels through the output lines electrically connected to the sensor pixels, detects threshold voltages of the first transistors based on the sensing signals, and generates compensation information; and
   a controller which adjusts reference voltages on the vertical line basis based on the compensation information,
   wherein
   the reference voltages are adjusted on the vertical line basis based on the threshold voltages of the first transistors, and
   the power supplier supplies the adjusted reference voltages to the power lines.

10. The display device according to claim 9, the fingerprint sensor further comprises:
a sensor scan driver which supplies sensor scan signals to sensor scan lines electrically connected to the sensor pixels.

11. The display device according to claim 10, wherein
the sensor scan driver simultaneously supplies the sensor scan signals to the sensor scan lines during a first sub-period,
the sensor scan driver sequentially supplies the sensor scan signals to the sensor scan lines during a second sub-period subsequent to the first sub-period, and
a frame period includes the first sub-period and the second sub-period.

12. The display device according to claim 11, wherein
a sensor pixel, which is electrically connected to an i-th sensor scan line of the sensor scan lines and a j-th output line of the output lines, comprises:
   a sensor circuit; and
   a first capacitor including a sensor electrode and an auxiliary electrode,
   wherein i and j are natural numbers, and
the sensor circuit comprises:
   the first transistor including a gate electrode electrically connected to the sensor electrode;
   a second transistor electrically connected between a j-th power line of the power lines and the first transistor; and
   a third transistor electrically connected between the j-th power line and the sensor electrode, and
   wherein the auxiliary electrode of the first capacitor is electrically connected to the i-th sensor scan line.

13. The display device according to claim 12, wherein
a gate electrode of the second transistor is electrically connected to the i-th sensor scan line, and
a gate electrode of the third transistor is electrically connected to an (i-1)-th sensor scan line of the sensor scan lines.

14. The display device according to claim 12, wherein when a touch of a hand of a user occurs on the fingerprint sensor, the sensor electrode forms a second capacitor with the hand of the user, and recognizes a fingerprint or a palm print of the user based on a change in capacitance of the second capacitor corresponding to the touch.

15. The display device according to claim 9, wherein the fingerprint sensor is disposed directly on the display panel.

16. The display device according to claim 15, wherein the fingerprint sensor is disposed directly on a thin-film encapsulation layer of the display panel.

17. A method of operating a fingerprint sensor, the method comprising:
detecting threshold voltages of first transistors included in respective sensor pixels of the fingerprint sensor;
adjusting reference voltages based on the detected threshold voltages;
supplying the adjusted reference voltages to power lines of the finger print sensor, which are electrically connected to the sensor pixels; and
sequentially supplying sensor scan signals to sensor scan lines of the finger print sensor, which are electrically connected to the sensor pixels,
wherein the first transistors control sensing signals to be outputted to output lines electrically connected to the sensor pixels, and
wherein the detecting the threshold voltages of the first transistors comprises:
supplying the reference voltages to the power lines;
simultaneously supplying the sensor scan signals to the sensor scan lines;
outputting the sensing signals through the output lines; and
detecting the thresholds voltages of the first transistors based on the sensing signals, and generating compensation information,
wherein the compensation information includes an average value of the threshold voltages of the first transistors of the sensor pixels electrically connected to each of the power lines.

* * * * *